United States Patent
Takahashi et al.

(10) Patent No.: US 10,540,626 B2
(45) Date of Patent: Jan. 21, 2020

(54) MANUFACTURING PROCESS MANAGEMENT SYSTEM, MANUFACTURING PROCESS MANAGEMENT METHOD, AND NON-TRANSITORY COMPUTER-READABLE RECORDING MEDIUM RECORDING MANUFACTURING PROCESS MANAGEMENT PROGRAM

(71) Applicant: FUJITSU LIMITED, Kawasaki-shi, Kanagawa (JP)

(72) Inventors: Kazuki Takahashi, Wako (JP); Takehiko Nishimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 15/864,959

(22) Filed: Jan. 8, 2018

(65) Prior Publication Data

US 2018/0129991 A1  May 10, 2018

Related U.S. Application Data

(63) Continuation of application No. PCT/JP2015/071160, filed on Jul. 24, 2015.

(51) Int. Cl.
*G06Q 10/06* (2012.01)
*G06Q 50/04* (2012.01)
(Continued)

(52) U.S. Cl.
CPC ......... *G06Q 10/0639* (2013.01); *G06Q 50/04* (2013.01); *G06T 11/206* (2013.01); *H04N 5/23293* (2013.01); *H04N 5/247* (2013.01)

(58) Field of Classification Search
CPC .............. G06Q 50/04; G06T 11/206; G05B 2219/31447; G05B 2219/31472; G05B 2219/31479; G05B 19/4183; H04N 7/181
See application file for complete search history.

(56) References Cited

U.S. PATENT DOCUMENTS

| | | | |
|---|---|---|---|
| 2014/0350708 A1 | 11/2014 | Kobayashi | |
| 2015/0097840 A1* | 4/2015 | Nishimura | G06T 11/206 |
| | | | 345/443 |

(Continued)

FOREIGN PATENT DOCUMENTS

| | | |
|---|---|---|
| JP | 2003-150230 | 5/2003 |
| JP | 2005-311528 | 11/2005 |

(Continued)

OTHER PUBLICATIONS

Extended European Search Report dated Jul. 13, 2018 for corresponding European Patent Application No. 15899567.0, 9 pages.

(Continued)

*Primary Examiner* — Obafemi O Sosanya
(74) *Attorney, Agent, or Firm* — Fujitsu Patent Center

(57) ABSTRACT

A manufacturing process management system includes: a display circuit; and a processor configured to: display, on the display circuit, a graph which represents an elapsed time from a start to a finish of each of a plurality of manufacturing processes through which a product is manufactured, based on information of starting times and finishing times of the manufacturing processes, in a state where the plurality of manufacturing processes are divided into each of manufacturing processes in an execution order and time axes are aligned in a same direction; specify, from among captured images of the plurality of manufacturing processes which are stored in a storage, a captured image which corresponds to the manufacturing process for a designated position on the displayed graph; and display the specified captured image on the display circuit.

18 Claims, 19 Drawing Sheets

(51) Int. Cl.
*G06T 11/20* (2006.01)
*H04N 5/232* (2006.01)
*H04N 5/247* (2006.01)

(56) References Cited

U.S. PATENT DOCUMENTS

| | | |
|---|---|---|
| 2016/0012361 A1 | 1/2016 | Sugiyama et al. |
| 2016/0012362 A1 | 1/2016 | Sugiyama et al. |
| 2016/0012363 A1 | 1/2016 | Sugiyama et al. |
| 2016/0012380 A1 | 1/2016 | Sugiyama et al. |
| 2016/0048930 A1 | 2/2016 | Sugiyama et al. |

FOREIGN PATENT DOCUMENTS

| | | |
|---|---|---|
| JP | 2006-172350 | 6/2006 |
| JP | 2006-302096 | 11/2006 |
| JP | 2010-040007 | 2/2010 |
| JP | 2014-211763 A | 11/2014 |
| JP | 2015-075795 | 4/2015 |
| WO | 2013/035687 | 3/2013 |

OTHER PUBLICATIONS

International Search Report, mailed in connection with PCT/JP2015/071160 and dated Oct. 13, 2015 (2 pages).
Chinese Office Action dated Oct. 23, 2019 for corresponding Chinese Patent Application No. 201580081760.2, with English Translation, 18 pages.

\* cited by examiner

FIG. 4

| PRODUCT NUMBER | PROCESS A | | PROCESS B | | PROCESS C | | PROCESS D | | PROCESS E | | PROCESS F | | PROCESS G | |
|---|---|---|---|---|---|---|---|---|---|---|---|---|---|---|
| | STARTING TIME | FINISHING TIME | STARTING TIME | FINISHING TIME | STARTING TIME | FINISHING TIME | STARTING TIME | FINISHING TIME | STARTING TIME | FINISHING TIME | STARTING TIME | FINISHING TIME | STARTING TIME | FINISHING TIME |
| SN0001 | 9:00:00 | 9:00:05 | 9:00:05 | 9:00:20 | 9:00:20 | 9:00:30 | 9:00:30 | 9:00:50 | 9:00:50 | 9:01:20 | 9:01:20 | 9:01:25 | 9:01:25 | 9:01:35 |
| SN0002 | 9:00:30 | 9:00:35 | 9:00:35 | 9:00:50 | 9:00:50 | 9:01:00 | 9:01:00 | 9:01:25 | 9:01:25 | 9:01:55 | 9:01:55 | 9:02:00 | 9:02:00 | 9:02:10 |
| SN0003 | 9:01:00 | 9:01:05 | 9:01:05 | 9:01:20 | 9:01:20 | 9:01:30 | 9:01:30 | 9:01:55 | 9:01:55 | 9:02:25 | 9:02:25 | 9:02:30 | 9:02:30 | 9:02:40 |
| SN0004 | 9:01:30 | 9:01:35 | 9:01:35 | 9:01:50 | 9:01:50 | 9:02:00 | 9:02:00 | 9:02:25 | 9:02:25 | 9:02:50 | 9:02:50 | 9:02:55 | 9:02:55 | 9:03:05 |
| SN0005 | 9:02:00 | 9:02:05 | 9:02:05 | 9:02:20 | 9:02:20 | 9:02:30 | 9:02:30 | 9:02:55 | 9:02:55 | 9:03:25 | 9:03:25 | 9:03:25 | 9:03:25 | 9:03:35 |
| SN0006 | 9:02:30 | 9:02:35 | 9:02:35 | 9:02:50 | 9:02:50 | 9:03:00 | 9:03:00 | 9:03:20 | 9:03:25 | 9:03:55 | 9:03:55 | 9:04:00 | 9:04:00 | 9:04:10 |
| ... | ... | ... | ... | ... | ... | ... | ... | ... | ... | ... | ... | ... | ... | ... |

121

| PROCESS | CAMERA ID | MASK | X | Y | Width | Height |
|---|---|---|---|---|---|---|
| A | CAMERA C1 | False | | | | |
| B | CAMERA C2 | False | | | | |
| C | CAMERA C2 | False | | | | |
| D | CAMERA C3 | False | | | | |
| E | CAMERA C4 | True | 10 | 10 | 200 | 400 |
| F | CAMERA C4 | True | 210 | 10 | 200 | 400 |
| G | CAMERA C4 | True | 420 | 10 | 200 | 400 |

FIG. 6

| CAMERA ID | RECORDING STARTING DATE | RECORDING FINISHING DATE | FILE NAME | ... |
|---|---|---|---|---|
| CAMERA C1 | 2015/7/10 8:55 | 2015/7/10 19:05 | C1-20150710.mp4 | ... |
| ... | ... | ... | ... | ... |
| CAMERA C2 | 2015/7/10 8:55 | 2015/7/10 19:05 | C2-20150710.mp4 | ... |
| ... | ... | ... | ... | ... |
| CAMERA C3 | 2015/7/10 8:55 | 2015/7/10 19:05 | C3-20150710.mp4 | ... |
| ... | ... | ... | ... | ... |
| CAMERA C4 | 2015/7/10 8:55 | 2015/7/10 19:05 | C4-20150710.mp4 | ... |
| ... | ... | ... | ... | ... |

123

MANUFACTURING PROCESS MANAGEMENT SYSTEM, MANUFACTURING PROCESS MANAGEMENT METHOD, AND NON-TRANSITORY COMPUTER-READABLE RECORDING MEDIUM RECORDING MANUFACTURING PROCESS MANAGEMENT PROGRAM

CROSS-REFERENCE TO RELATED APPLICATION

This application is a continuation application of International Application PCT/JP2015/071160 filed on Jul. 24, 2015 and designated the U.S., the entire contents of which are incorporated herein by reference.

FIELD

The embodiments relates to a manufacturing process management system, a manufacturing process management method, and a non-transitory computer-readable recording medium recording a manufacturing process management program.

BACKGROUND

Accumulation and utilization of data accompanying activities of a company have been performed. For example, data such as action logs of a manufacturing apparatus in an assembly line of a product are accumulated and utilized for an improvement in a production process. Further, it has been suggested that the flow of product is plotted on a graph expressed by processes and times and the manufacturing statuses in the processes are thereby visualized and displayed. An example of related art is disclosed in Japanese Laid-open Patent Publication No. 2015-075795.

SUMMARY

According to an aspect of the embodiments, a manufacturing process management system includes: a display circuit; and a processor configured to: display, on the display circuit, a graph which represents an elapsed time from a start to a finish of each of a plurality of manufacturing processes through which a product is manufactured, based on information of starting times and finishing times of the manufacturing processes, in a state where the plurality of manufacturing processes are divided into each of manufacturing processes in an execution order and time axes are aligned in a same direction; specify, from among captured images of the plurality of manufacturing processes which are stored in a storage, a captured image which corresponds to the manufacturing process for a designated position on the displayed graph; and display the specified captured image on the display circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram that illustrates one example of a history DB.

FIG. 6 is a diagram that illustrates one example of an image DB.

DESCRIPTION OF EMBODIMENT

For example, in a case where a user views the graph that visualizes the manufacturing statuses of the processes and notices the presence of the process in which a further check is requested, the user may desire to check how work in the process is performed.

For example, a manufacturing process management system, a manufacturing process management method, and a manufacturing process management program that may display an image which corresponds to a designated process may be provided.

An embodiment of a manufacturing process management system, a manufacturing process management method, and a manufacturing process management program, which are disclosed by this application, is hereinafter be described in detail with reference to drawings. Note that the disclosed techniques are not limited by this embodiment. Further, the following embodiment may appropriately be combined in the scope in which a contradiction does not occur.

Figure 1:
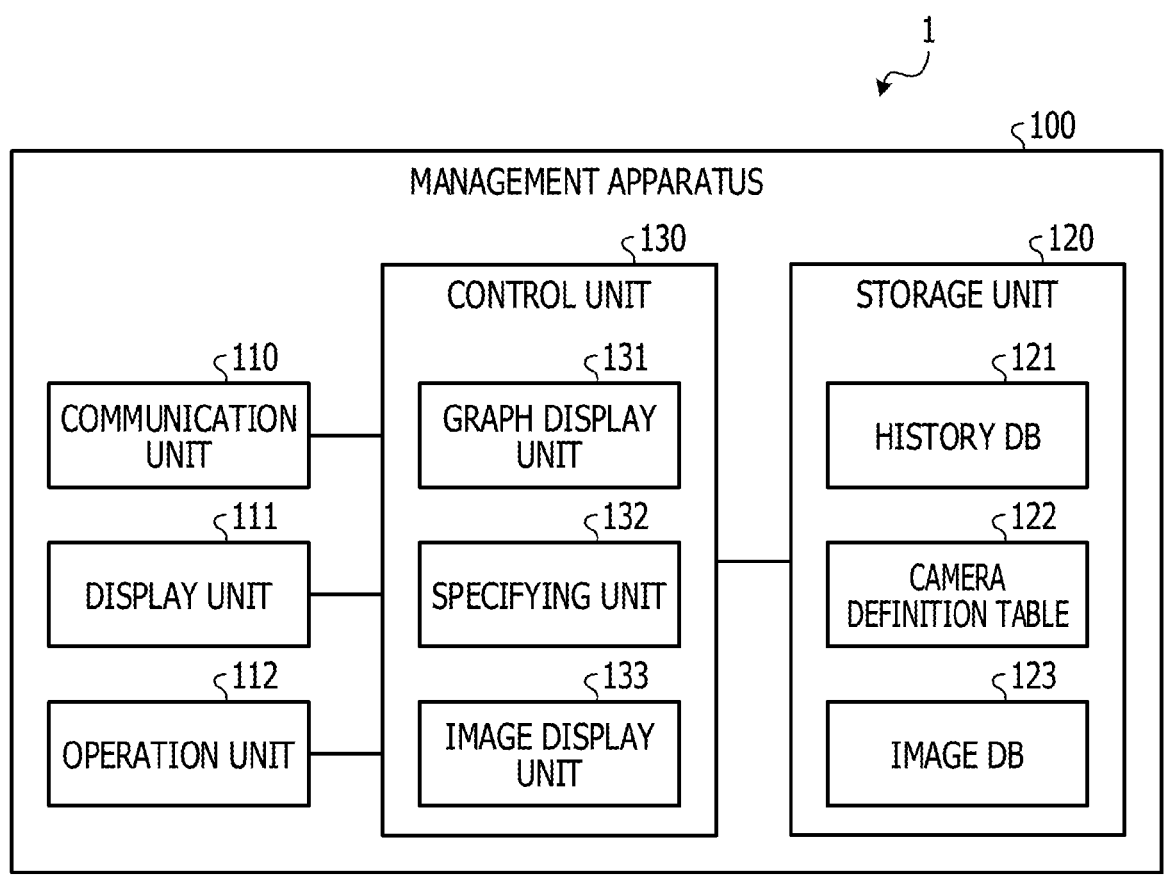
FIG. 1 is a block diagram that illustrates one example of a configuration of a manufacturing process management system of an embodiment.

FIG. 1 is a block diagram that illustrates one example of a configuration of the manufacturing process management system of the embodiment. A manufacturing process management system 1 illustrated in FIG. 1 has a management apparatus 100. The manufacturing process management system 1 may include a control apparatus of each manufacturing process, a control apparatus of a machine tool, and various kinds of examination apparatuses for a temperature examination and so forth, for example, other than the management apparatus 100. The management apparatus 100 may acquire log data from various kinds of apparatuses. Further, the manufacturing process management system 1 may include a terminal apparatus for an administrator. The management apparatus 100 and various kinds of apparatuses are connected so as to be capable of mutual communication via a network, which is not illustrated. Note that in the following description, a case where various kinds of information of an assembly line of a product are acquired as log data.

The management apparatus 100 of the manufacturing process management system 1 illustrated in FIG. 1 displays a manufacturing status of a product that is manufactured through a plurality of manufacturing processes. The displayed manufacturing statuses are a graph based on information of starting times and finishing times of the manufacturing processes based on the log data and captured images in which the manufacturing processes are captured, for example. Note that in the following description, the manufacturing process may simply be referred to as process. The management apparatus 100 displays a graph that represents the elapsed time from the start to the finish of each manufacturing process of a plurality of manufacturing processes, based on the information of the starting times and the finishing times of the manufacturing processes, in a state where the plurality of manufacturing processes are divided into each of manufacturing processes in the execution order, while the time axes are aligned in the same direction. The management apparatus 100 specifies the captured image that corresponds to the manufacturing process which corresponds to a designated position among captured images of the plurality of manufacturing processes that are stored in a storage unit in accordance with the designated position on the displayed graph. The management apparatus 100 displays the specified captured image. Accordingly, the management apparatus 100 may display the image that corresponds to the designated process.

Figure 2:
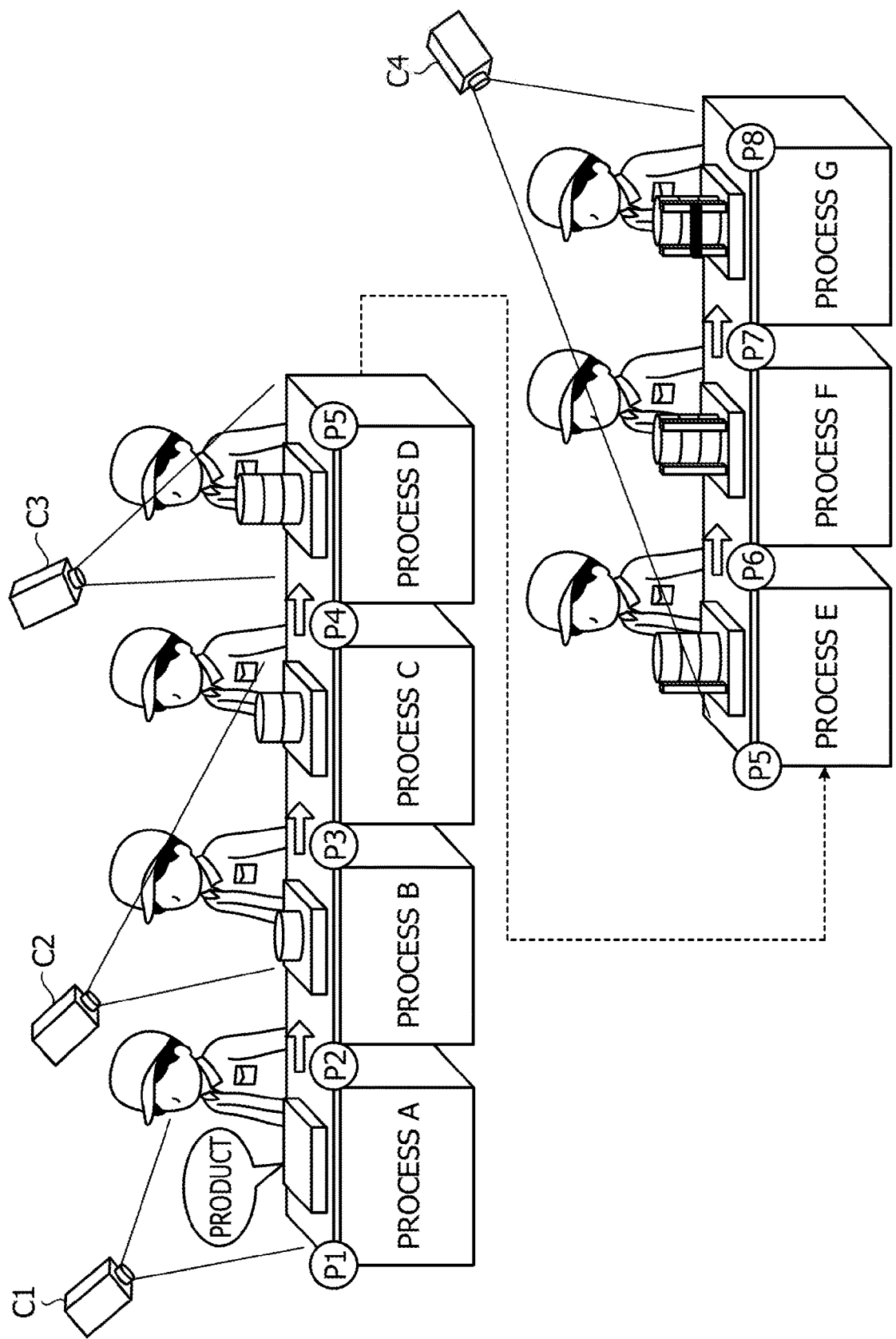
FIG. 2 is a diagram that illustrates one example of manufacturing processes.

One example of the manufacturing processes in this embodiment is described by using FIG. 2. FIG. 2 is a diagram that illustrates one example of the manufacturing processes. As illustrated in FIG. 2, the manufacturing processes have seven processes of process A to process G. In each of the processes, for example, a worker carries out assembly work for the product. In the example in FIG. 2, the starting and finishing timings of the respective processes are denoted by P1 to P8. In this embodiment, for example, because the product flows on a manufacturing line, a description is made on an assumption that the finishing timing of process A is simultaneous with the starting timing of process B, for example. Note that in a case where the product is moved between the processes, the starting and finishing timings of the processes may be different timings. Further, in the example of the manufacturing processes in FIG. 2, a camera C1 that captures an image of process A, a camera C2 that captures an image of process B and process C, a camera C3 that captures an image of process D, and a camera C4 that captures an image of processes E to G are placed.

Figure 3:
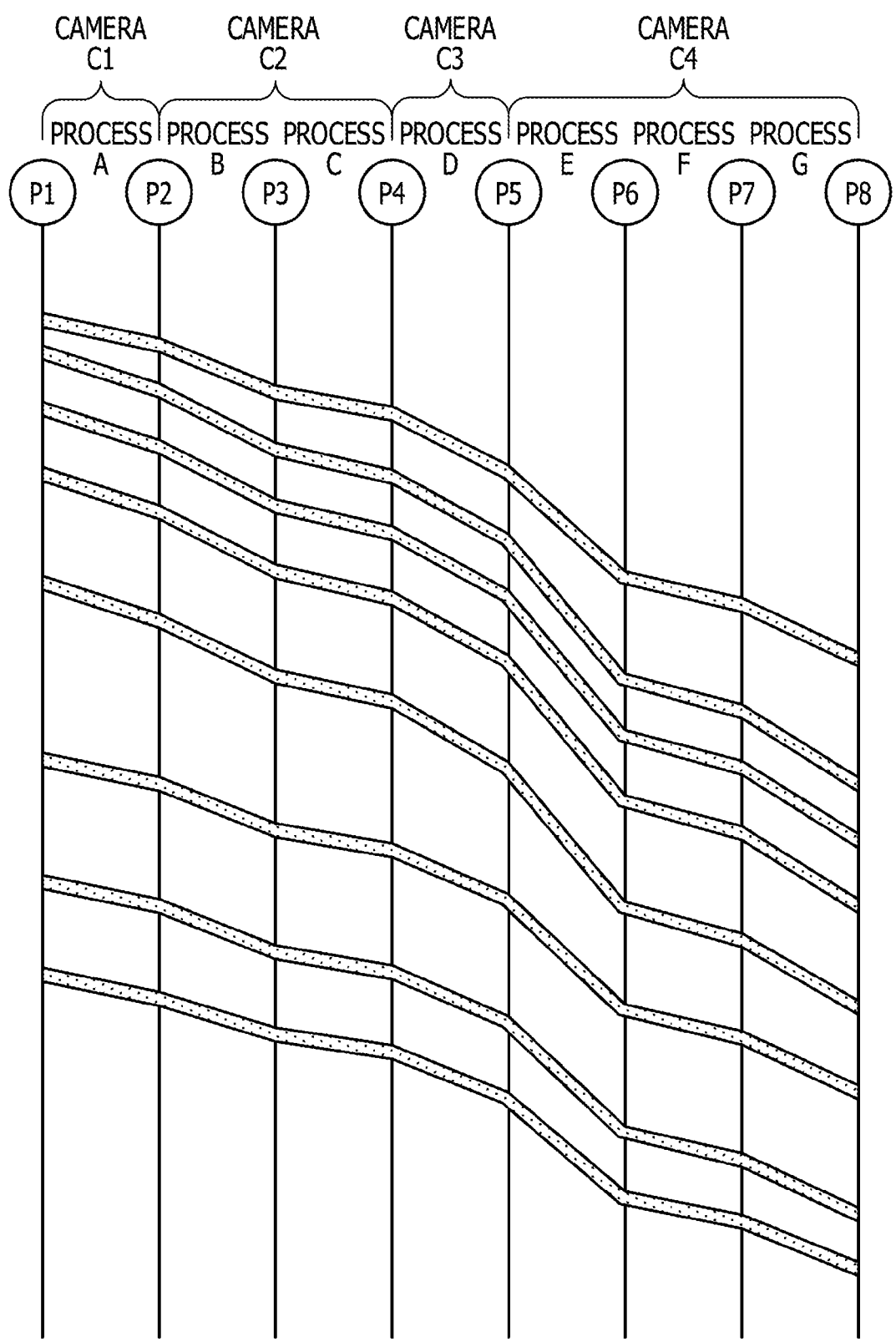
FIG. 3 is a diagram that illustrates one example of a graph which represents statuses of manufacturing processes.

One example of the graph that represents the statuses of the manufacturing processes in this embodiment is described by using FIG. 3. FIG. 3 is a diagram that illustrates one example of the graph which represents the statuses of the manufacturing processes. As illustrated in FIG. 3, the graph that represents the statuses of the manufacturing processes (hereinafter referred to as time line graph) corresponds to the manufacturing processes illustrated in FIG. 2 and is the graph that indicates the elapsed times in the respective processes. A time axis P1 of the time line graph illustrated in FIG. 3 corresponds to the starting timing P1 of process A in FIG. 2. Further, a time axis P2 of the time line graph illustrated in FIG. 3 corresponds to the finish timing of process A and the starting timing P2 of process B in FIG. 2. Then, similarly, time axes P3 to P8 of the time line graph illustrated in FIG. 3 correspond to the starting and finishing timings P3 to P8 of the respective processes in FIG. 2. Further, the upper portion of the time line graph in FIG. 3 indicates the relationships between the cameras C1 to C4 and processes A to G, which are illustrated in FIG. 2. Further, in the time line graph, the flow of the product is indicated by line segments that connect the processes. The line segment is expressed as trace graph because the line segment traces the flow of the product in the manufacturing processes.

Next, returning to FIG. 1, a configuration of the management apparatus 100 is described. As illustrated in FIG. 1, the management apparatus 100 has a communication unit 110, a display unit 111, an operation unit 112, a storage unit 120, and a control unit 130. Note that the management apparatus 100 may have various kinds of function units, which a known computer has, other than the function units illustrated in FIG. 1, for example, function units such as various kinds of input devices and sound output devices.

The communication unit 110 is realized by a network interface card (NIC), for example. The communication unit 110 is a communication interface that is connected with various kinds of apparatuses via a network, which is not illustrated, in a wired or wireless manner and that conducts communication of information among the various kinds of apparatuses. The communication unit 110 receives the log data from the various kinds of apparatuses. The communication unit 110 outputs the received log data to the control unit 130.

The display unit 111 is a display device for displaying various kinds of information. The display unit 111 is realized as a display device by a liquid crystal display or the like, for example. The display unit 111 displays various kinds of screens such as display screens that are input from the control unit 130.

The operation unit 112 is an input device that accepts various kinds of operations from the administrator of the manufacturing process management system 1. The operation unit 112 is realized as an input device by a keyboard, a mouse, or the like, for example. The operation unit 112 outputs an operation input by the administrator as operation information to the control unit 130. The operation information includes position information on the display screen in a pointing operation to bring a mouse cursor to a displayed object (hereinafter also referred to as cursor position information), for example. Note that the operation unit 112 may be realized as the input device by a touch panel or the like, and the display device of the display unit 111 and the input device of the operation unit 112 may be integrated.

The storage unit 120 is realized by a storage apparatus such as a random access memory (RAM), a semiconductor memory element such as a flash memory, a hard disk, or an optical disk, for example. The storage unit 120 has a history database 121, a camera definition table 122, and an image database 123. Note that in the following description, database is expressed while abbreviated as DB. Further, the storage unit 120 stores information that is used in processing in the control unit 130.

The history DB 121 is a database that stores a history of the product, which is manufactured by sequential performance of manufacturing by a plurality of processes, in each of the manufacturing processes. That is, the history DB 121 stores the times of starting and finishing the manufacturing in each of the processes as a history with respect to each of the products based on the log data. FIG. 4 is a diagram that illustrates one example of the history DB. As illustrated in FIG. 4, the history DB 121 has items such as "product number" and "starting time" and "finishing time" of each of the processes. The history DB 121 stores one record for each of the products, for example.

"Product number" is a number that is uniquely given to each of the products which is manufactured in a factory and is an identifier that identifies the product. "Starting time" is information that indicates the time when manufacturing is started in the corresponding process. "Finishing time" is information that indicates the time when manufacturing is finished in the corresponding process. The example in the first row in FIG. 4 indicates that, as for the product of the product number "SN0001", process A is started at "9:00:00" and finished at "9:00:05", process B is started at "9:00:05" and finished at "9:00:20", and process C is started at "9:00:20" and finished at "9:00:30". The example in the first row in FIG. 4 then indicates the starting time and the finishing time of each of the processes about processes D to G, similarly.

Figure 5:
FIG. 5 is a diagram that illustrates one example of a camera definition table.

Returning to the description of FIG. 1, the camera definition table 122 stores a camera ID of the camera that corresponds to each of the processes. FIG. 5 is a diagram that illustrates one example of the camera definition table. As illustrated in FIG. 5, the camera definition table 122 has items such as "process", "camera ID", "mask", "X", "Y", "width", and "height". The camera definition table 122 stores one record for each of the processes, for example.

"Process" is an identifier that identifies the process. "Camera ID" is an identifier that identifies the camera which captures an image of each of the processes. "Mask" is information about whether or not the other processes are masked in order to individually display the designated process in a case where the camera captures an image of a plurality of processes. "Mask" is indicated as "True" in a case where the other processes are masked but is indicated as "False" in a case where the other processes are not masked. "X" and "Y" are coordinate information for designating the origin of a displayed rectangle in a case where the "mask" is "True". "Width" and "height" are information for designating the width and height of the displayed rectangle in a case where "mask" is "True".

Returning to the description of FIG. 1, the image DB 123 stores the captured image that is captured by the camera. FIG. 6 is a diagram that illustrates one example of the image DB. As illustrated in FIG. 6, the image DB 123 has items such as "camera ID", "recording starting date", "recording finishing date", and "file name". The image DB 123 stores one record for each piece of recording of the captured image, for example.

"Camera ID" is the identifier that identifies the camera which captures an image of each of the processes. "Recording starting date" is information that indicates the recording starting date of the captured image. "Recording finishing date" is information that indicates the recording finishing date of the captured image. "File name" is information that indicates a file name of the captured image that is stored in the storage unit 120. "File name" is decided based on the camera ID and the recording starting date or the recording finishing date, for example. The example in the first row in FIG. 6 indicates that, as for the camera ID "camera C1", the file name of the captured image for which recording is started at "2015 Jul. 10 8:55" and recording is finished at "2015 Jul. 10 19:05" is "C1-20150710.mp4". That is, the image DB 123 may specify the file of the desired captured image based on the camera ID and the date in a case where the captured image is searched for. Note that the captured image may be a moving image, may be a still image, or may include sound.

Returning to the description of FIG. 1, for example, a central processing unit (CPU), a micro processing unit (MPU), or the like executes a program stored in an internal storage apparatus with a RAM serving as a work area, and the control unit 130 is thereby realized. Further, the control unit 130 may be realized by an integrated circuit such as an application specific integrated circuit (ASIC) or a field programmable gate array (FPGA), for example. The control unit 130 has a graph display unit 131, a specifying unit 132, and an image display unit 133 and realizes or executes functions and operation of information processing, which are described in the following. Note that an internal configuration of the control unit 130 is not limited to the configuration illustrated in FIG. 1 but may be another configuration as long as the configuration performs information processing described later. Note that in the following description, the line segment that corresponds to each of the products is also expressed as trace graph, and the whole graph that includes the respective time axes of the processes and the trace graphs which correspond to the products is expressed as time line graph.

The graph display unit 131 refers to the history DB 121 and generates the time line graph in a case where the operation information for displaying the display screen that displays the manufacturing statuses is input from the operation unit 112. That is, the graph display unit 131 generates the time line graph that represents the elapsed time from the start to the finish of each manufacturing process of the plurality of manufacturing processes based on the information of the starting times and the finishing times of the manufacturing processes. Further, the graph display unit 131 causes the display unit 111 to display the generated time line graph in a state where the plurality of manufacturing processes are divided into each of manufacturing processes in the execution order, while the time axes are aligned in the same direction.

The graph display unit 131 acquires the starting time and the finishing time of each of the products in each of the processes in the history DB 121. The graph display unit 131 generates the time axes P1 to P8 that indicate the elapsed times of the respective processes and generates the line segment (trace graph) that connects the time axes for each of the product. Note that the graph display unit 131 generates the time axes such that the directions of the time axes go along the time order from the upper side toward the lower side of the time line graph, for example. In the time line graph, a portion between the time axes corresponds to each of the processes. In the example in FIG. 3, the portion between the time axes P1 and P2 indicates the time requested for process A. The graph display unit 131 similarly generates the line segment for each of the products.

The graph display unit 131 arranges the time axes P1 to P8 and processes A to G in the execution order of the processes, that is, in the order of processes A to G in the examples in FIG. 2 and FIG. 3. The graph display unit 131 generates the display screen that includes the time line graph in which the processes, the time axes, and the line segments are arranged, outputs the generated display screen to the display unit 111, and causes the display unit 111 to display the generated display screen. Note that the display screen includes regions for displaying the time line graph and the captured images by the cameras. Further, the graph display unit 131 outputs the generated display screen to the specifying unit 132 and the image display unit 133.

In a case where the display screen is input from the graph display unit 131, the specifying unit 132 specifies the captured image based on the cursor position information of the operation information that is input from the operation unit 112. That is, the specifying unit 132 specifies the captured image that corresponds to the manufacturing process which corresponds to the designated position based on the cursor position information among the captured images of the plurality of manufacturing processes that are stored in the image DB 123 in accordance with the designated position on the displayed time line graph.

The specifying unit 132 compares the cursor position information with the coordinates on the display screen and assesses whether or not the line segment is selected by a click operation. In a case where the line segment is not selected, the specifying unit 132 executes usual mode processing. As the usual mode processing, the specifying unit 132 first calculates a display designation date based on a pointed position that is indicated by the cursor position information. Further, the specifying unit 132 specifies a display designation process based on the pointed position. Note that the pointed position is the pointed position that is indicated by a touch position in a case where the operation unit 112 is a touch panel.

The specifying unit 132 assesses whether or not the pointed position is on any process based on the calculated display designation date and the specified display designation process. In a case where the pointed position is not on any process, the specifying unit 132 refers to the image DB 123, acquires the captured images by all the cameras on the display designation date, and outputs the acquired captured images to the image display unit 133.

In a case where the pointed position is on any process, the specifying unit 132 refers to the camera definition table 122 and acquires the camera ID of the camera that corresponds to the process on which the pointed position is, that is, the camera ID of a display designation camera. The specifying unit 132 assesses which of emphasis or individual display of display methods is selected based on the selection situation of an emphasis button and an individual display button that are provided on the display screen. In a case where the emphasis is selected, the specifying unit 132 refers to the image DB 123, acquires the captured images by all the cameras on the display designation date, and outputs the acquired captured images to the image display unit 133. Further, the specifying unit 132 outputs, to the image display unit 133, an emphasis instruction for emphatically displaying a display frame of the captured image that corresponds to the acquired camera ID.

In a case where the individual display is selected, the specifying unit 132 refers to the image DB 123, acquires the captured image on the display designation date, which corresponds to the acquired camera ID, and outputs the acquired captured image to the image display unit 133. Further, the specifying unit 132 refers to the camera definition table 122 and assesses whether or not the mask item of the acquired camera ID is "True". In a case where the mask item of the acquired camera ID is "True", the specifying unit 132 outputs, to the image display unit 133, a masking instruction for masking the other processes than the process that corresponds to the acquired camera ID. Note that the specifying unit 132 decides the size and position of the mask based on the items of "X", "Y", "width", and "height" of the camera definition table 122. In a case where the mask item of the acquired camera ID is not "True", the specifying unit 132 does not output the masking instruction. Note that in a case where the emphasis or the individual display is selected, the specifying unit 132 may set the display regions of the captured images as different regions between the emphasis and the individual display or may perform the display in the same region while the emphasis and the individual display are switched.

In a case where both of the emphasis and the individual display are selected, the specifying unit 132 executes similar processing to a case where the emphasis is selected for the region that displays the captured images by all the cameras. Further, the specifying unit 132 executes similar processing to a case where the individual display is selected for the region that displays the captured image for the individual display. That is, the case where both of the emphasis and the individual display are selected is a case where the captured images are displayed in different regions for the emphasis and the individual display.

Figure 7:
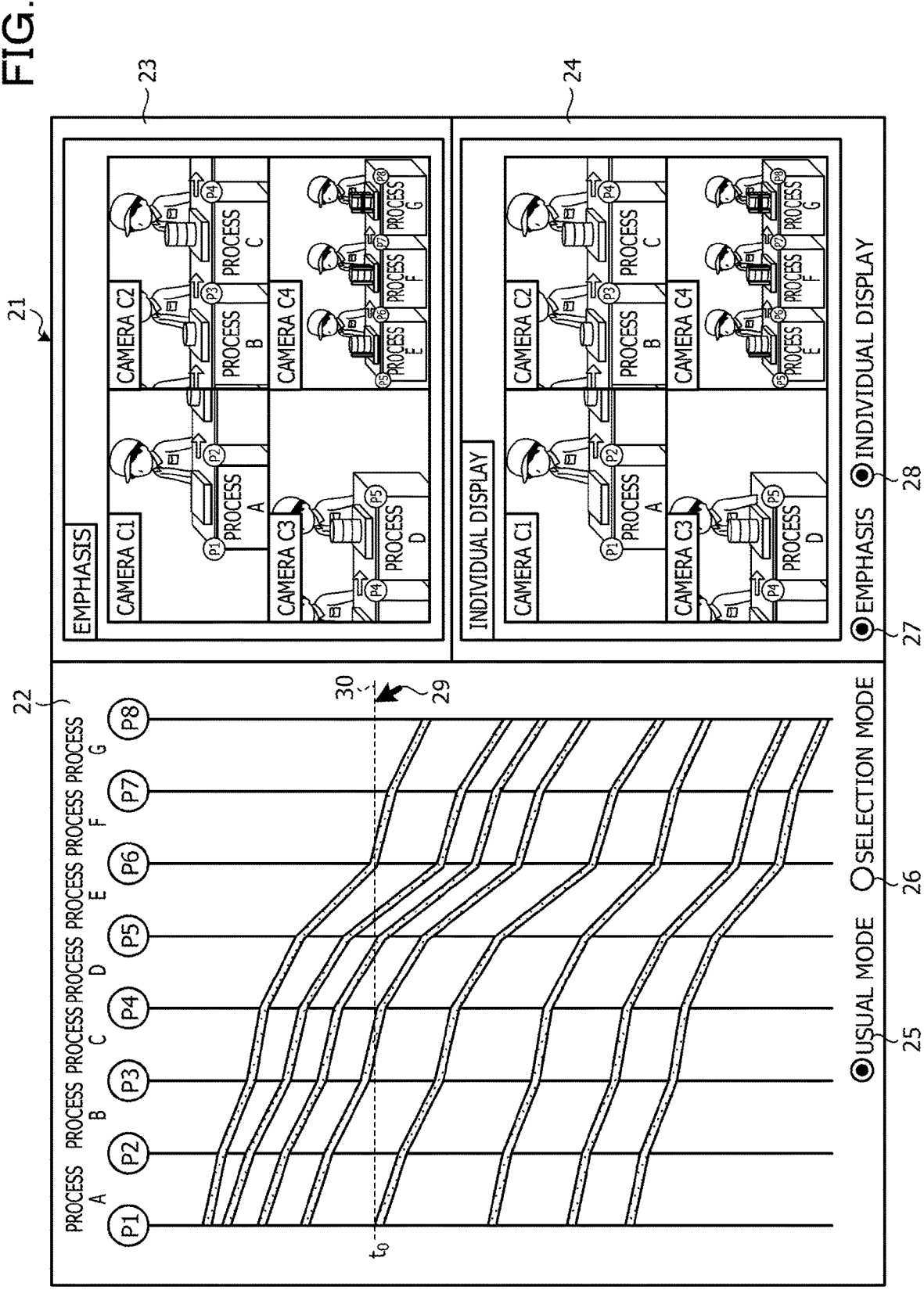
FIG. 7 is a diagram that illustrates one example of a display screen in a usual mode.

Here, examples of the display screen in the usual mode are described by using FIG. 7 to FIG. 10. Note that in FIG. 7 to FIG. 10, it is assumed that the emphasis and the individual display are selected as the display methods. FIG. 7 is a diagram that illustrates one example of the display screen in the usual mode. As illustrated in FIG. 7, a display screen 21 is one example of the display screen in the usual mode and has a region 22 that displays the time line graph, a region 23 that displays the captured images by all the cameras, and a region 24 that individually displays the captured image by the camera which corresponds to the process corresponding to the pointed position. In the region 23, for example, in a case where four cameras are present, the region 23 is divided into four regions, and the captured images that correspond to the cameras are displayed in the respective regions. Further, the display screen 21 has a usual mode button 25 and a selection mode button 26 for selecting an action mode. In addition, the display screen 21 has an emphasis button 27 and an individual display button 28 for selecting the display method.

In the example in FIG. 7, because a cursor 29 is not present on any process of the region 22, the emphasis and the individual display are not performed, but the captured images by all the cameras are displayed in the region 24 for the individual display, similarly to the region 23. The captured images displayed in this case are the captured images at time $t_0$ that is indicated by a line 30 which corresponds to the pointed position by the cursor 29.

Figure 8:
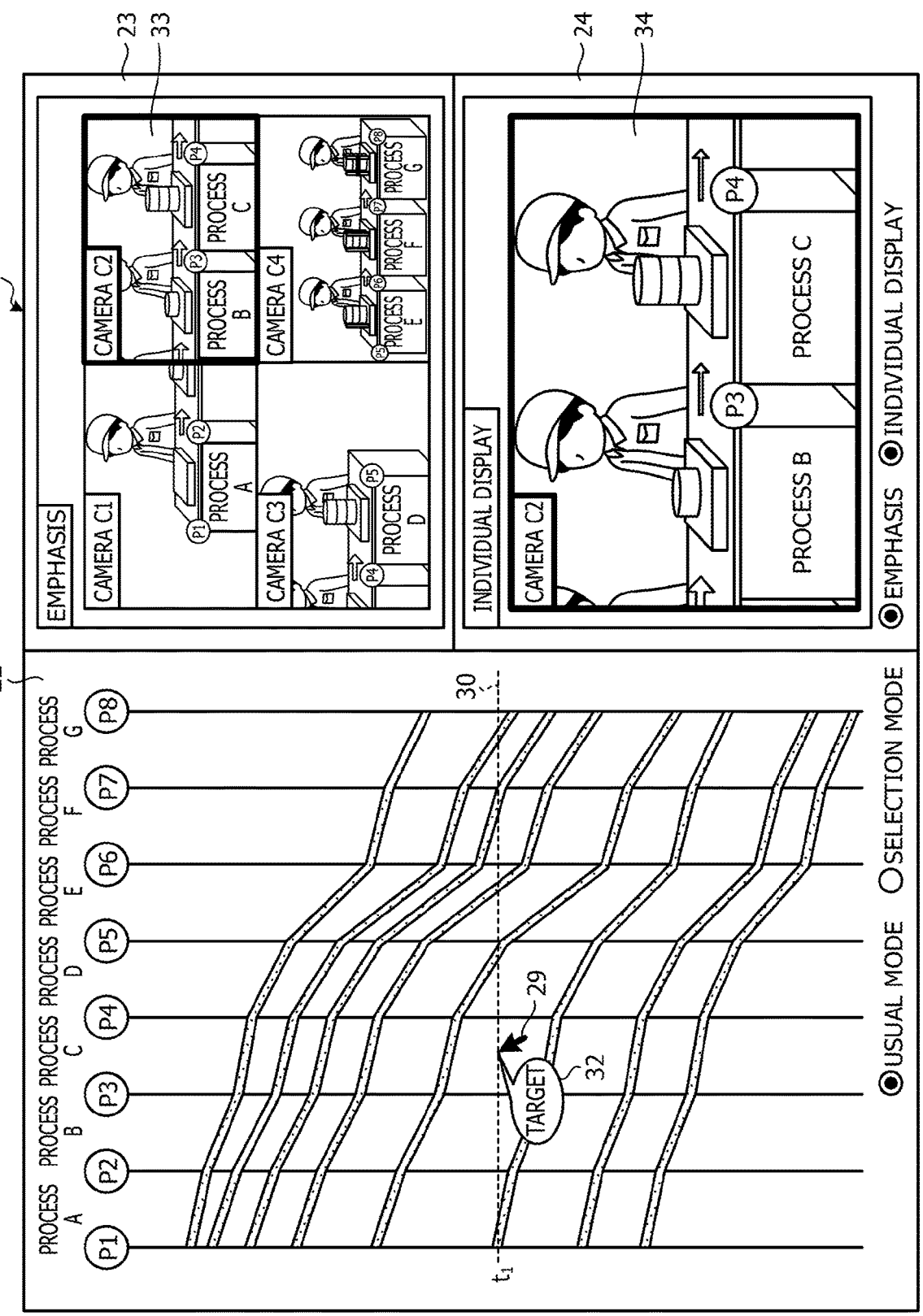
FIG. 8 is a diagram that illustrates another example of the display screen in the usual mode.

FIG. 8 is a diagram that illustrates another example of the display screen in the usual mode. As illustrated in FIG. 8, in a display screen 31, the cursor 29 is present on process C, and an icon 32, which indicates the target of the emphasis and the individual display, points the same position as the cursor 29. Further, in the display screen 31, the captured images at time $t_1$ that is indicated by the line 30 which corresponds to the positions of the cursor 29 and the icon 32 are displayed in the region 23 and the region 24. In the region 23, a captured image 33 by the camera C2 that corresponds to process C is emphatically displayed by performing thickening, coloring, or the like of the display frame, for example. Further, in the region 24, a captured image 34 by the camera C2 is individually displayed. Note that the region 24 may be emphatically displayed by performing thickening, coloring, or the like of the display frame in a case of the individual display.

Figure 9:
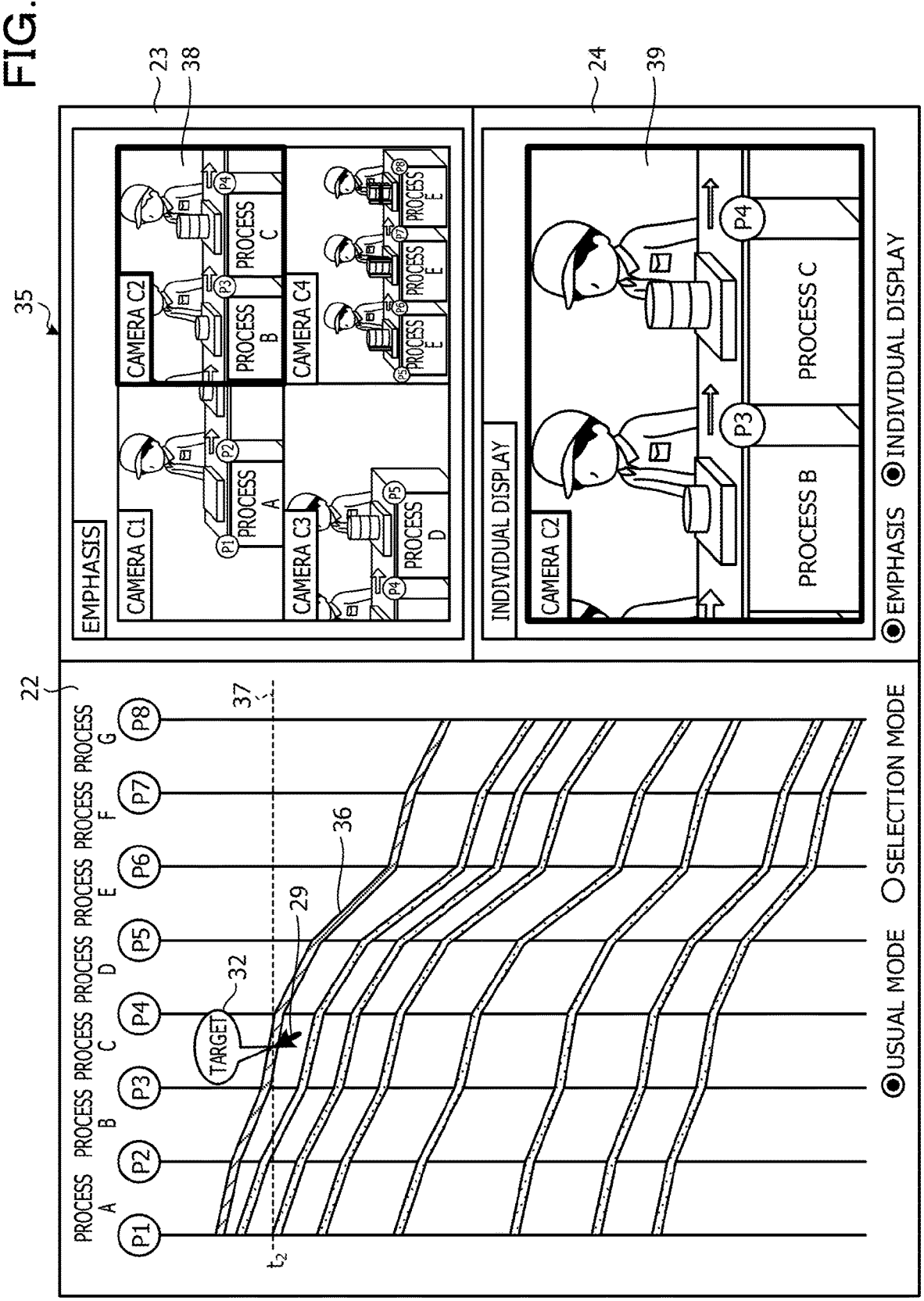
FIG. 9 is a diagram that illustrates another example of the display screen in the usual mode.

FIG. 9 is a diagram that illustrates another example of the display screen in the usual mode. As illustrated in FIG. 9, in a display screen 35, the cursor 29 is present on a line segment 36 of process C, and the icon 32 points the same position as the cursor 29. The line segment 36 is displayed in a different color from the other line segments, for example, in order to indicate a fact the line segment 36 is pointed by the cursor 29. Further, in the display screen 35, the captured images at time $t_2$ that is indicated by a line 37 which corresponds to the positions of the cursor 29 and the icon 32 are displayed in the region 23 and the region 24. In the region 23, a captured image 38 by the camera C2 that corresponds to process C is emphatically displayed by performing thickening, coloring, or the like of the display frame, for example. Here, in the captured image 38, an image of the product that corresponds to the line segment 36 is captured. Further, in the region 24, a captured image 39 by the camera C2 is individually displayed. In the captured image 39, similarly to the captured image 38, an image of the product that corresponds to the line segment 36 is captured.

Figure 10:
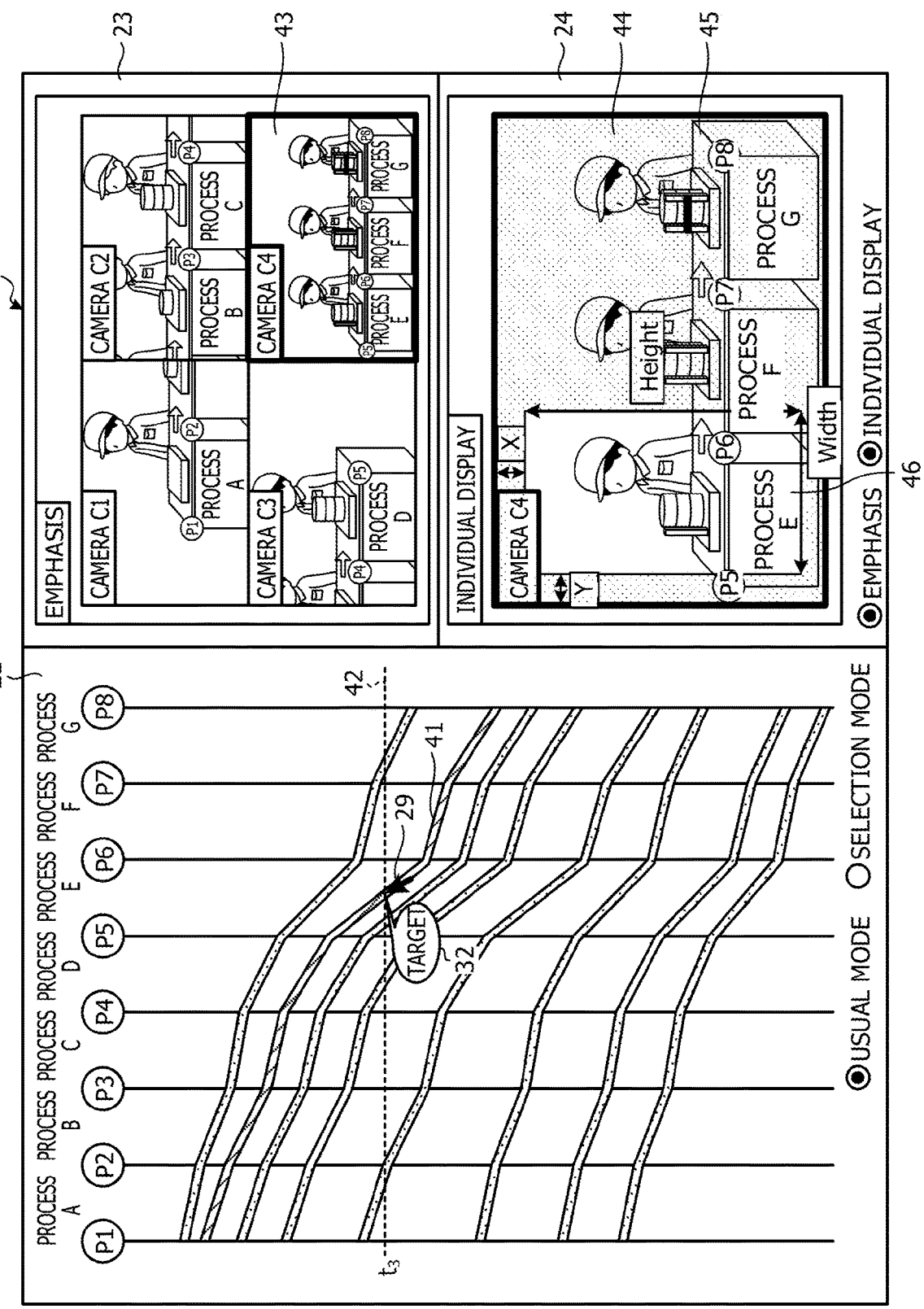
FIG. 10 is a diagram that illustrates another example of the display screen in the usual mode.

FIG. 10 is a diagram that illustrates another example of the display screen in the usual mode. As illustrated in FIG. 10, in a display screen 40, the cursor 29 is present on a line segment 41 of process E, and the icon 32 points the same position as the cursor 29. The line segment 41 is displayed in a different color from the other line segments, for example, in order to indicate a fact the line segment 41 is pointed by the cursor 29. Further, in the display screen 40, the captured images at time $t_3$ that is indicated by a line 42 which corresponds to the positions of the cursor 29 and the icon 32 are displayed in the region 23 and the region 24. In the region 23, a captured image 43 by the camera C4 that corresponds to process E is emphatically displayed by performing thickening, coloring, or the like of the display frame, for example. Here, in the captured image 43, an image of the product that corresponds to the line segment 41 is captured. Further, in the region 24, a captured image 44 by the camera C4 is individually displayed. In the captured image 44, a mask 45 is displayed so as to mask other portions than a region 46 that corresponds to process E such that process E and the product that corresponds to the line segment 41 may easily be distinguished.

Returning to the description of FIG. 1, in a case where the line segment is selected in the assessment about whether or not the line segment is selected, the specifying unit 132 executes selection mode processing. As the selection mode processing, the specifying unit 132 first calculates the display designation date based on the pointed position that is indicated by the cursor position information. Note that the display designation process is specified by selection of the line segment. The specifying unit 132 assesses whether or not the display designation date is within all process times of the selected product. That is, the specifying unit 132 assesses whether or not the display designation date is between the time of the time axis P1 and the time of the time axis P8 of the line segment that corresponds to the selected product. Note that a selection mode is canceled in a case where the selected line segment or a portion off the line segment is clicked. Further, in the selection mode, the clicked line segment is selected in a case where the other line segment is clicked while the line segment is selected.

In a case where the display designation date is not within all the process times of the selected product, the specifying unit 132 outputs, to the image display unit 133, an out-of-range instruction that displays a fact that the display designation date is out of range in the region for displaying the captured image. In a case where the display designation date is within all the process times of the selected product, the specifying unit 132 sets the intersection point between the line segment of the selected product and the line that indicates the display designation date as a display target and specifies the display designation process. Here, the cursor may be in another portion than the line segment of the selected product. The specifying unit 132 refers to the camera definition table 122 and acquires the camera ID of the display designation camera that corresponds to the process in which the intersection point as the display target is.

The specifying unit 132 assesses which of the emphasis or the individual display of the display methods is selected based on the selection situation of the emphasis button and the individual display button that are provided on the display screen. The processing based on the assessment about which of the emphasis or the individual display of the display methods is selected is similar to the cases of the usual mode, and a description thereof is thus not made.

The specifying unit 132 assesses whether or not the operation information for finishing the display is input from the operation unit 112 while the display screen of the time line graph and the captured images are displayed. In a case where the operation information for finishing the display is not input, the specifying unit 132 continues to display the display screen of the time line graph and the captured images and executes the usual mode processing or the selection mode processing based on presence or absence of selection of the line segment. In a case where the operation information for finishing the display is input, the specifying unit 132 outputs, to the image display unit 133, a finishing instruction that finishes the display of the display screen of the time line graph and the captured images.

Figure 11:
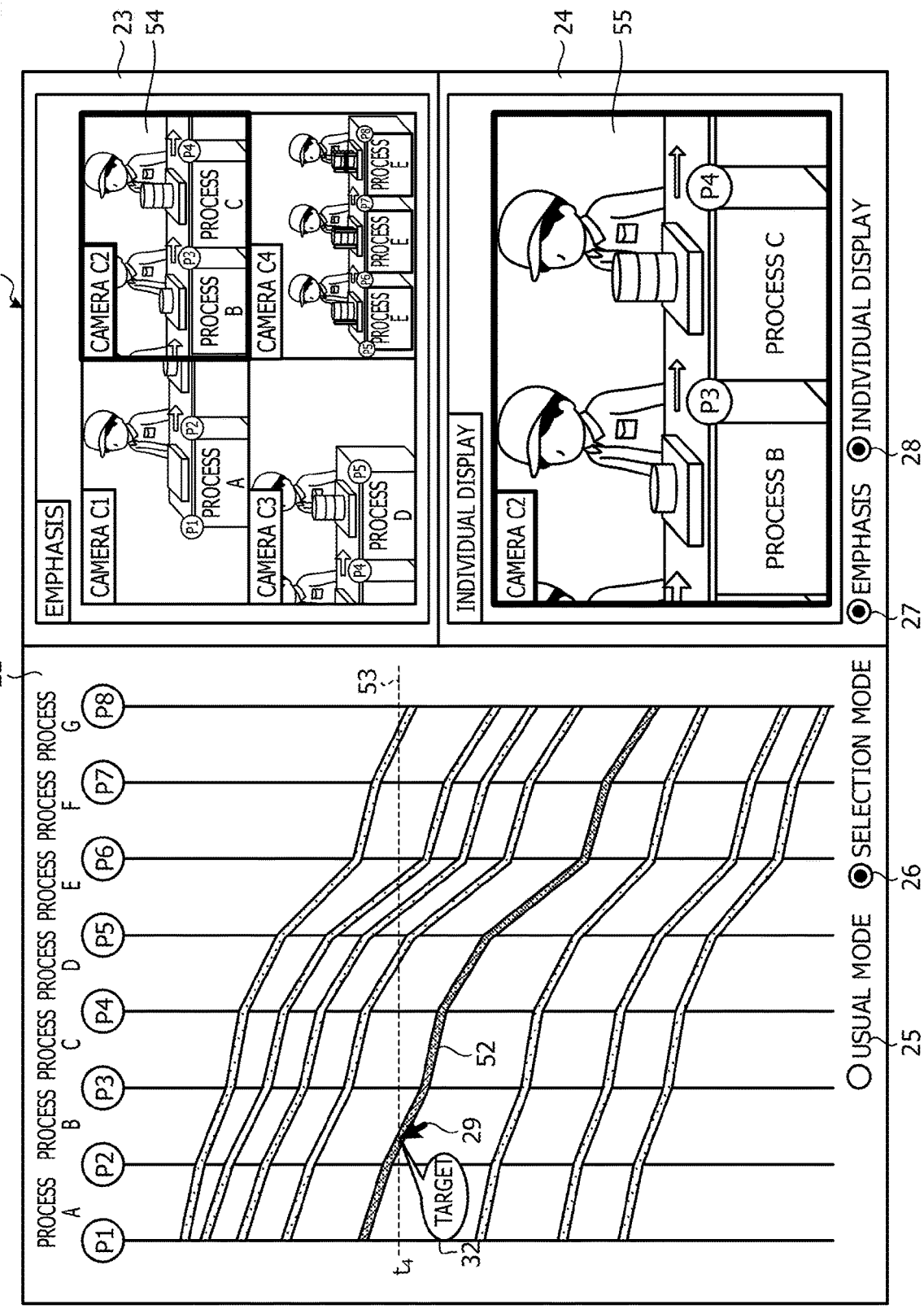
FIG. 11 is a diagram that illustrates one example of a display screen in a selection mode.

Here, examples of the display screen in the selection mode are described by using FIG. 11 to FIG. 14. Note that in FIG. 11 to FIG. 14, it is assumed that the emphasis and the individual display are selected as the display methods. FIG. 11 is a diagram that illustrates one example of the display screen in the selection mode. As illustrated in FIG. 11, similarly to the display screen in the usual mode, a display screen 51 has the region 22 that displays the time line graph, the region 23 that displays the captured images by all the cameras, and the region 24 that individually displays the captured image by the camera which corresponds to the process corresponding to the pointed position. In the region 23, for example, similarly to the display screen in the usual mode, in a case where four cameras are present, the region 23 is divided into four regions, and the captured images that correspond to the cameras are displayed in the respective regions. Further, similarly to the display screen in the usual mode, the display screen 51 has the usual mode button 25 and the selection mode button 26 for selecting the action mode. Note that in the display screen 51, the selection mode button 26 is selected. In addition, similarly to the display screen in the usual mode, the display screen 51 has the emphasis button 27 and the individual display button 28 for selecting the display method.

In the display screen 51, the cursor 29 is present on process B, and the icon 32, which indicates the target of the emphasis and the individual display, points the same position as the cursor 29. A line segment 52 is displayed in a different color from the other line segments, for example, in order to indicate a fact the line segment 52 is clicked and selected by the cursor 29. Further, in the display screen 51, the captured images at time $t_4$ that is indicated by a line 53 which corresponds to the positions of the cursor 29 and the icon 32 are displayed in the region 23 and the region 24. Note that the positions of the cursor 29 and the icon 32 are a first designated position. In the region 23, a captured image 54 by the camera C2 that corresponds to process B is emphatically displayed by performing thickening, coloring, or the like of the display frame, for example. Here, in the captured image 54, an image of the product that corresponds to the line segment 52 is captured. Further, in the region 24, a captured image 55 by the camera C2 is individually displayed. In the captured image 55, similarly to the captured image 54, an image of the product that corresponds to the line segment 52 is captured. Note that similarly to the usual mode, the region 24 may be emphatically displayed by performing thickening, coloring, or the like of the display frame in a case of the individual display.

Figure 12:
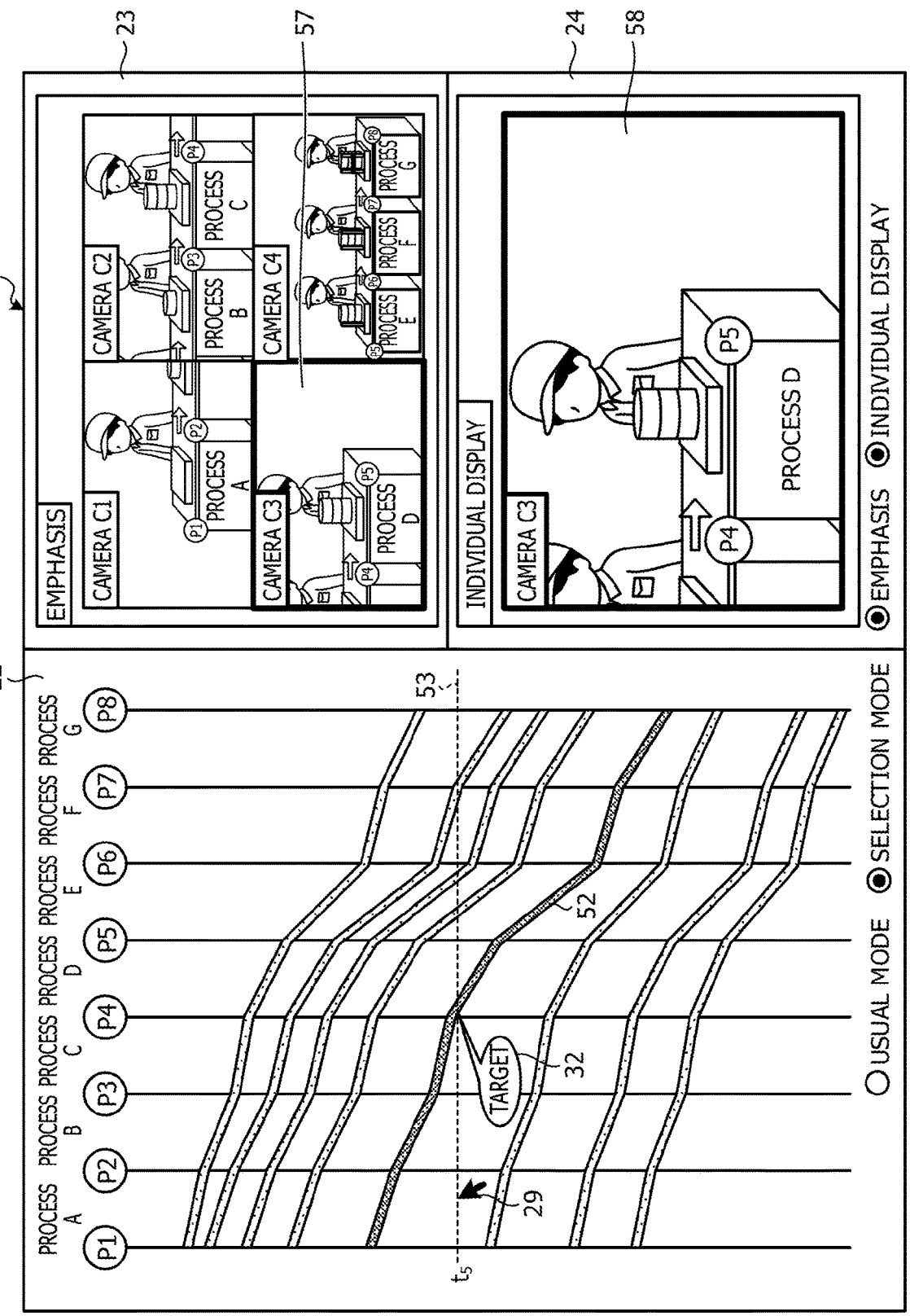
FIG. 12 is a diagram that illustrates another example of the display screen in the selection mode.

FIG. 12 is a diagram that illustrates another example of the display screen in the selection mode. As illustrated in FIG. 12, in a display screen 56, the cursor 29 is positioned in a different region from the position of the line segment 52 that is specified by the first designated position in FIG. 11. The position of the cursor 29 is a second designated position that is pointed. In the display screen 56, the line 53 moves in the time axis direction in response to the movement of the cursor 29. Here, the icon 32 moves on the line segment 52 and indicates the intersection point between the line segment 52 on process D and the line 53. Note that the line segment 52 is displayed in a different color from the other line segments, for example, in order to indicate a fact the line segment 52 is selected. Further, in the display screen 56, the captured images at time $t_5$ that is indicated by the line 53 which corresponds to the position of the icon 32 are displayed in the region 23 and the region 24. In the region 23, a captured image 57 by the camera C3 that corresponds to process D is emphatically displayed by performing thickening, coloring, or the like of the display frame, for example. Here, in the captured image 57, an image of the product that corresponds to the line segment 52 is captured. Further, in the region 24, a captured image 58 by the camera C3 is individually displayed. In the captured image 58, similarly to the captured image 57, an image of the product that corresponds to the line segment 52 is captured.

Figure 13:
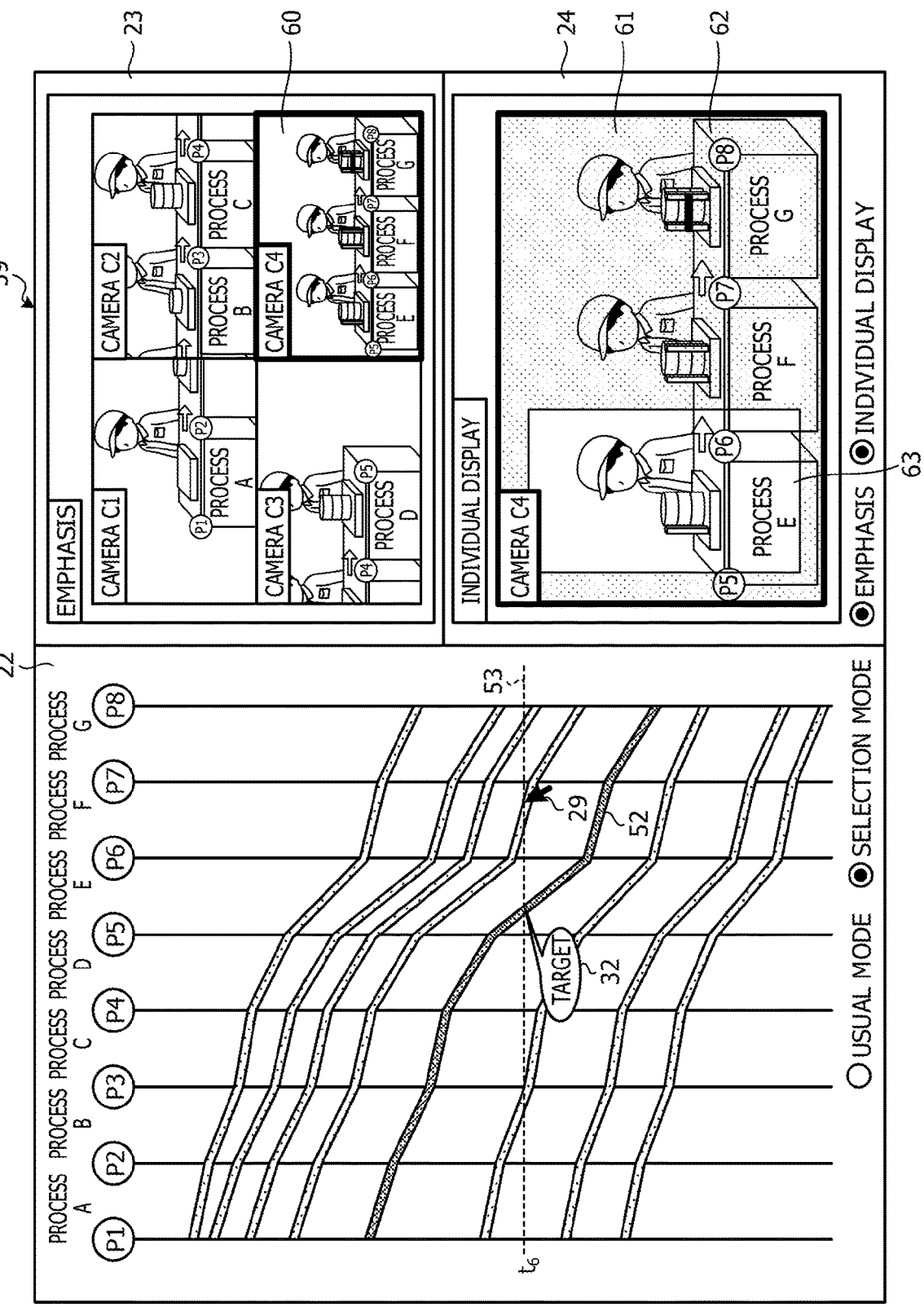
FIG. 13 is a diagram that illustrates another example of the display screen in the selection mode.

FIG. 13 is a diagram that illustrates another example of the display screen in the selection mode. As illustrated in FIG. 13, in a display screen 59, the cursor 29 is positioned in a different region from the position of the line segment 52 that is specified by the first designated position in FIG. 11. The position of the cursor 29 is the second designated position that is pointed. In the display screen 59, the line 53 moves in the time axis direction in response to the movement of the cursor 29. Here, the icon 32 moves on the line segment 52 and indicates the intersection point between the line segment 52 on process E and the line 53. Note that the line segment 52 is displayed in a different color from the other line segments, for example, in order to indicate a fact the line segment 52 is selected. Further, in the display screen 59, the captured images at time $t_6$ that is indicated by the line 53 which corresponds to the position of the icon 32 are displayed in the region 23 and the region 24. In the region 23, a captured image 60 by the camera C4 that corresponds to process E is emphatically displayed by performing thickening, coloring, or the like of the display frame, for example. Here, in the captured image 60, an image of the product that corresponds to the line segment 52 is captured. Further, in the region 24, a captured image 61 by the camera C4 is individually displayed. In the captured image 61, similarly to the captured image 60, an image of the product that corresponds to the line segment 52 is captured. In the captured image 61, a mask 62 is displayed so as to mask other portions than a region 63 that corresponds to process E such that process E and the product that corresponds to the line segment 52 may easily be distinguished.

Figure 14:
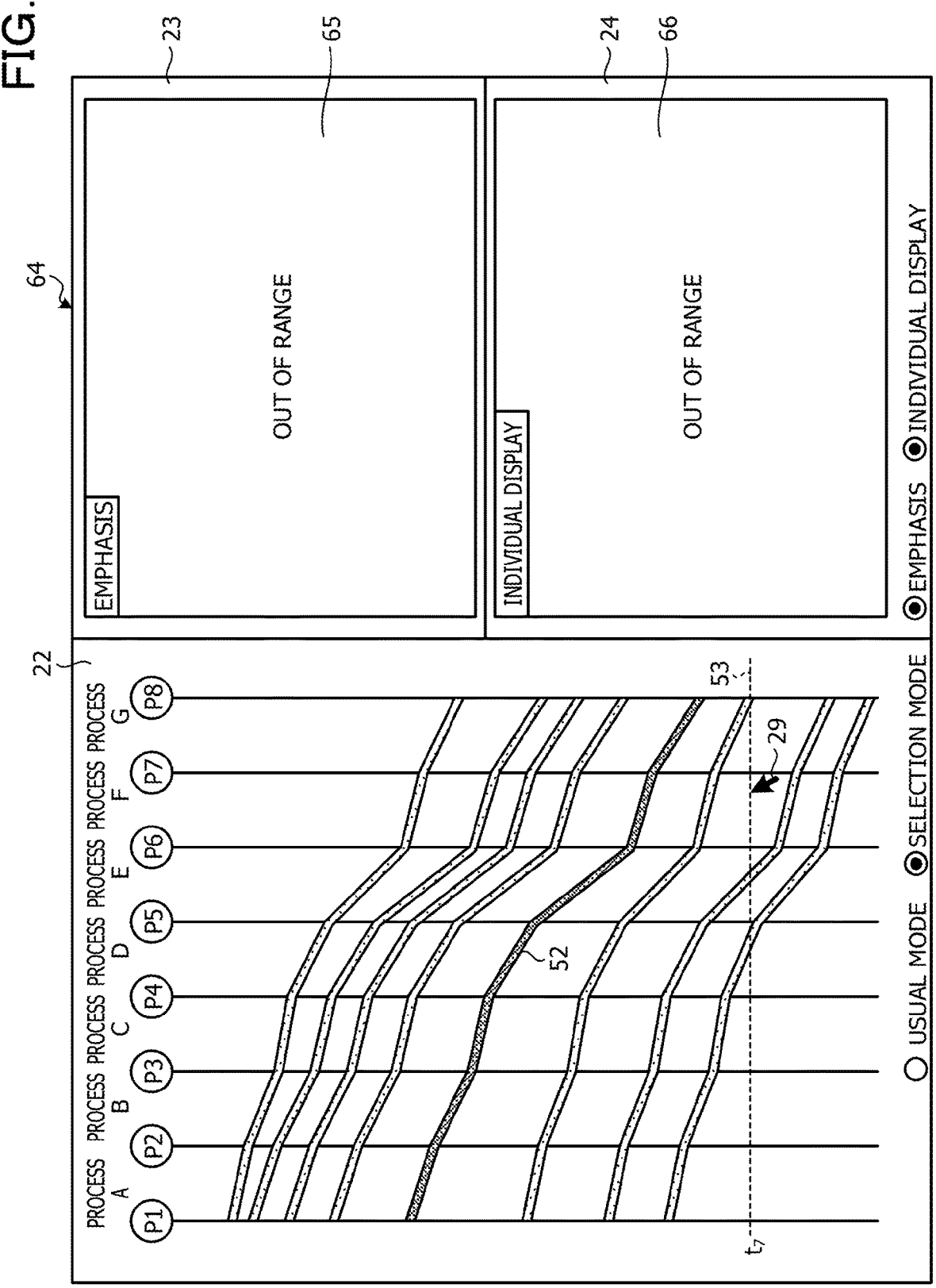
FIG. 14 is a diagram that illustrates another example of the display screen in the selection mode.

FIG. 14 is a diagram that illustrates another example of the display screen in the selection mode. As illustrated in FIG. 14, in a display screen 64, the cursor 29 is positioned in a different region from the position of the line segment 52 that is specified by the first designated position in FIG. 11. The position of the cursor 29 is the second designated position that is pointed. In the display screen 64, the line 53 moves in the time axis direction in response to the movement of the cursor 29. In the display screen 64, the cursor 29 and the line 53 are out of the range of the starting time and the finishing time of the line segment 52. Note that the line segment 52 is displayed in a different color from the other line segments, for example, in order to indicate a fact the line segment 52 is selected. Further, in the display screen 64, the captured images at time $t_7$ that is indicated by the line 53 are not displayed because the line 53 is out of the range of the starting time and the finishing time of the line segment 52. In the region 23, display 65 that indicates out of range is displayed. In the region 24, display 66 that indicates out of range is displayed.

Figure 15:
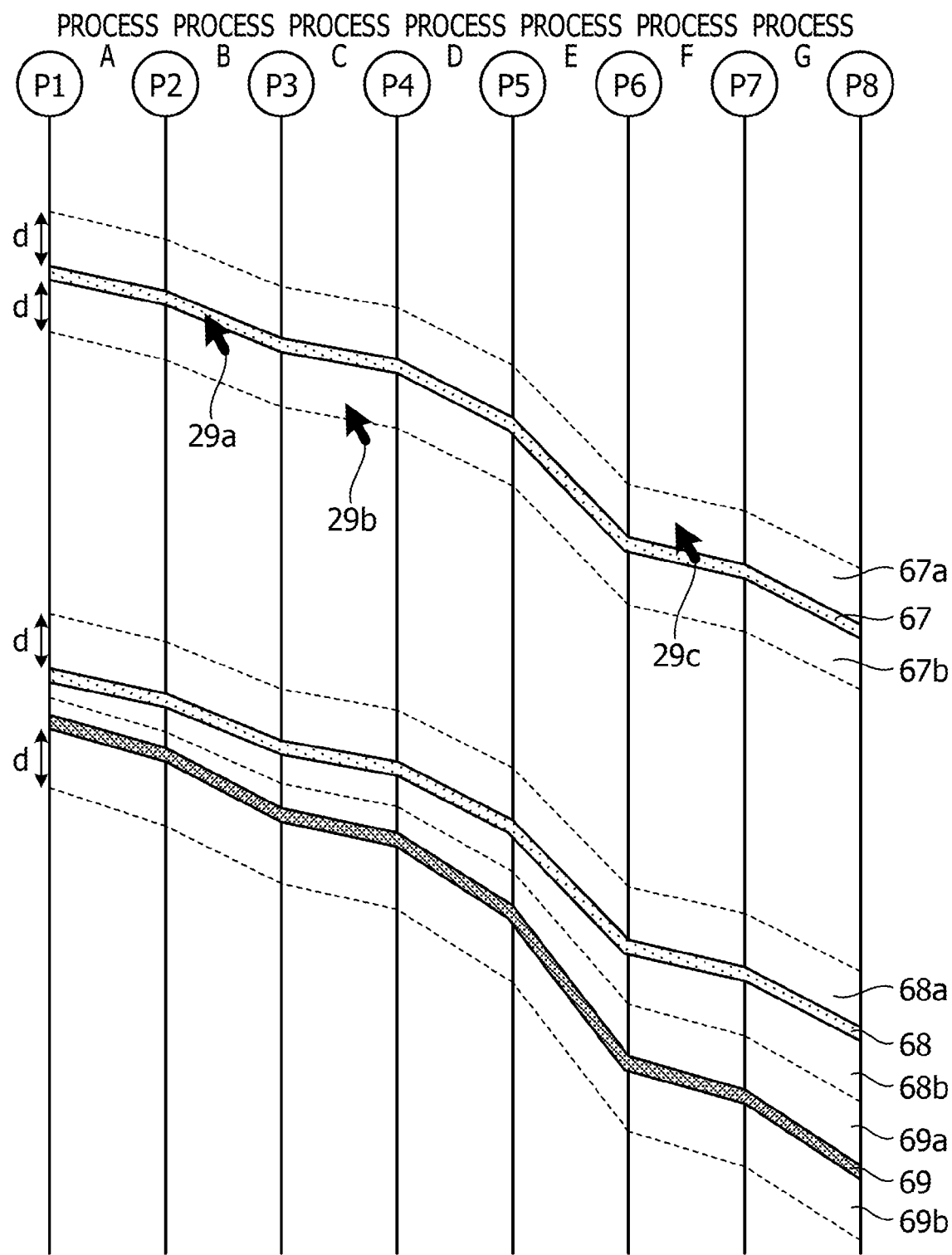
FIG. 15 is a diagram that illustrates one example of an additional assessment region in selection of a line segment.

Further, in a case where the line segment is selected, a thin line segment may not be pointed well. FIG. 15 is a diagram that illustrates one example of an additional assessment region in selection of the line segment. In the example in FIG. 15, in a case where a line segment 67 is pointed, regions 67a and 67b that are adjacent to the line segment 67 are set as the additional assessment regions. The regions 67a and 67b are set as the widths to distances d that are equivalent distances from the line segment 67, for example. In this case, even in any cases of a cursor 29a that is pointed on the line segment 67, a cursor 29b that is pointed on the region 67b, and a cursor 29c that is pointed on the region 67a, it is assessed that the line segment 67 is pointed.

Further, as for a line segment 68 and a line segment 69 in FIG. 15, the interval between the line segments is distance 2d or less in a portion. In this case, for the portion in which the interval between the line segments on the line segment 69 side is distance 2d or less in regions 68a and 68b that are the additional assessment regions adjacent to the line segment 68, the middle of the line segment 68 and the line segment 69 is set as the border between the region 68b and a region 69a. Note that for the line segment 69, regions 69a and 69b that are adjacent to the line segment 69 are set as the additional assessment regions.

Returning to the description of FIG. 1, the display screen is input from the graph display unit 131 to the image display unit 133. In a case where the captured image is input from the specifying unit 132, the image display unit 133 updates the display screen such that the captured image is displayed in the region for displaying the captured image by the camera in the display screen. Further, in a case where the emphasis instruction is input from the specifying unit 132, the image display unit 133 updates the display screen such that the display frame of the captured image that corresponds to the emphasis instruction is emphatically displayed. Further, in a case where the masking instruction is input from the specifying unit 132, the image display unit 133 refers to the camera definition table 122 and updates the display screen such that the mask that corresponds to the masking instruction is drawn. In a case where the out-of-range instruction is input from the specifying unit 132, the image display unit 133 updates the display screen such that the display that indicates out of range is performed in the region for displaying the captured image by the camera in the display screen. In addition, in a case where the finishing instruction is input from the specifying unit 132, the image display unit 133 finishes the display of the display screen.

Figure 16:
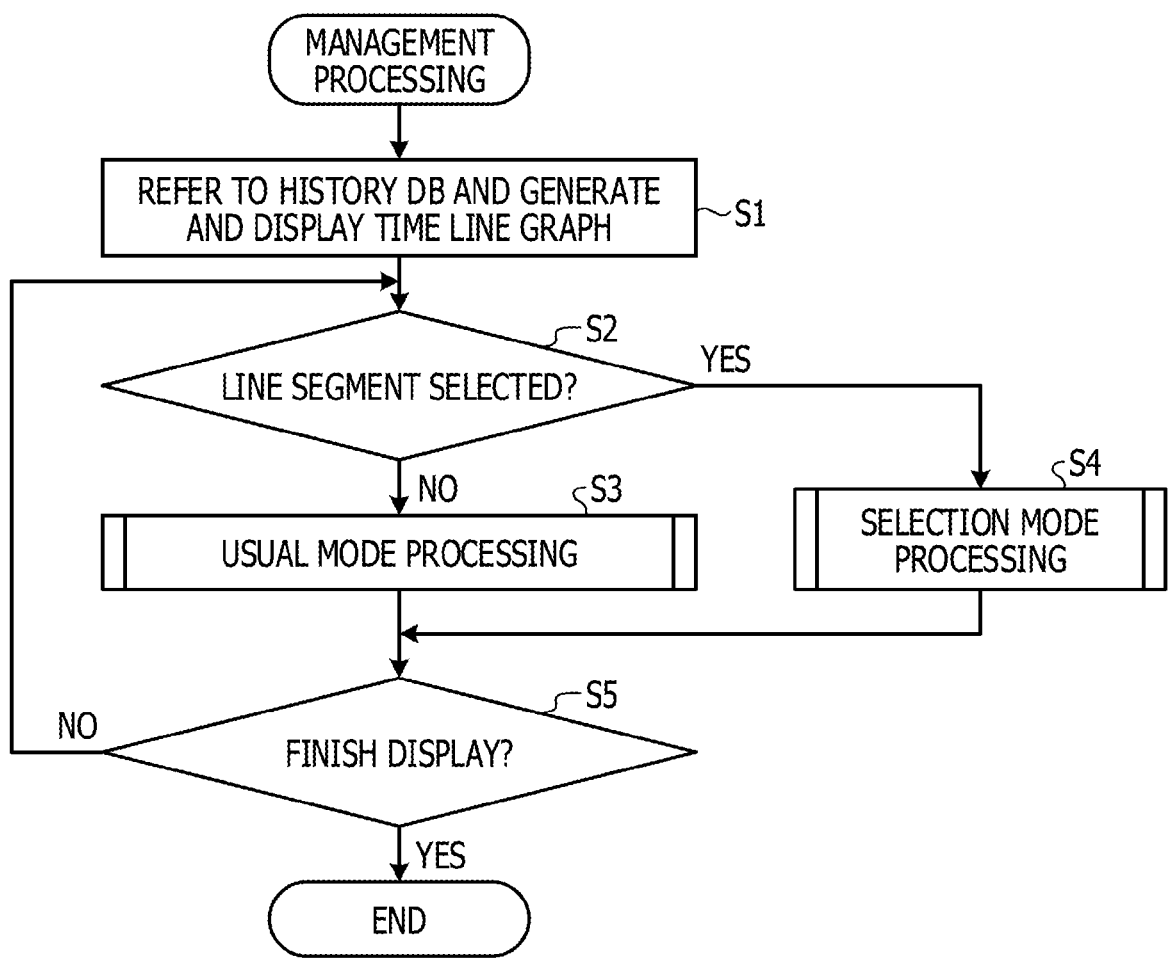
FIG. 16 is a flowchart that illustrates one example of management processing of the embodiment.

Next, an action of the management apparatus 100 of the embodiment is described. FIG. 16 is a flowchart that illustrates one example of management processing of the embodiment.

The graph display unit 131 refers to the history DB 121 and generates the time line graph in a case where the operation information for displaying the display screen that displays the manufacturing statuses is input from the operation unit 112 (step S1). The graph display unit 131 generates the display screen that includes the generated time line graph, outputs the generated display screen to the display unit 111, and causes the display unit 111 to display the generated display screen. Further, the graph display unit 131 outputs the generated display screen to the specifying unit 132 and the image display unit 133.

In a case where the display screen is input from the graph display unit 131, the specifying unit 132 compares the cursor position information of the operation information input from the operation unit 112 with the coordinates on the display screen and assesses whether or not the line segment is selected by the click operation (step S2). In a case where the line segment is not selected (step S2: negative), the specifying unit 132 executes the usual mode processing (step S3).

Figure 17:
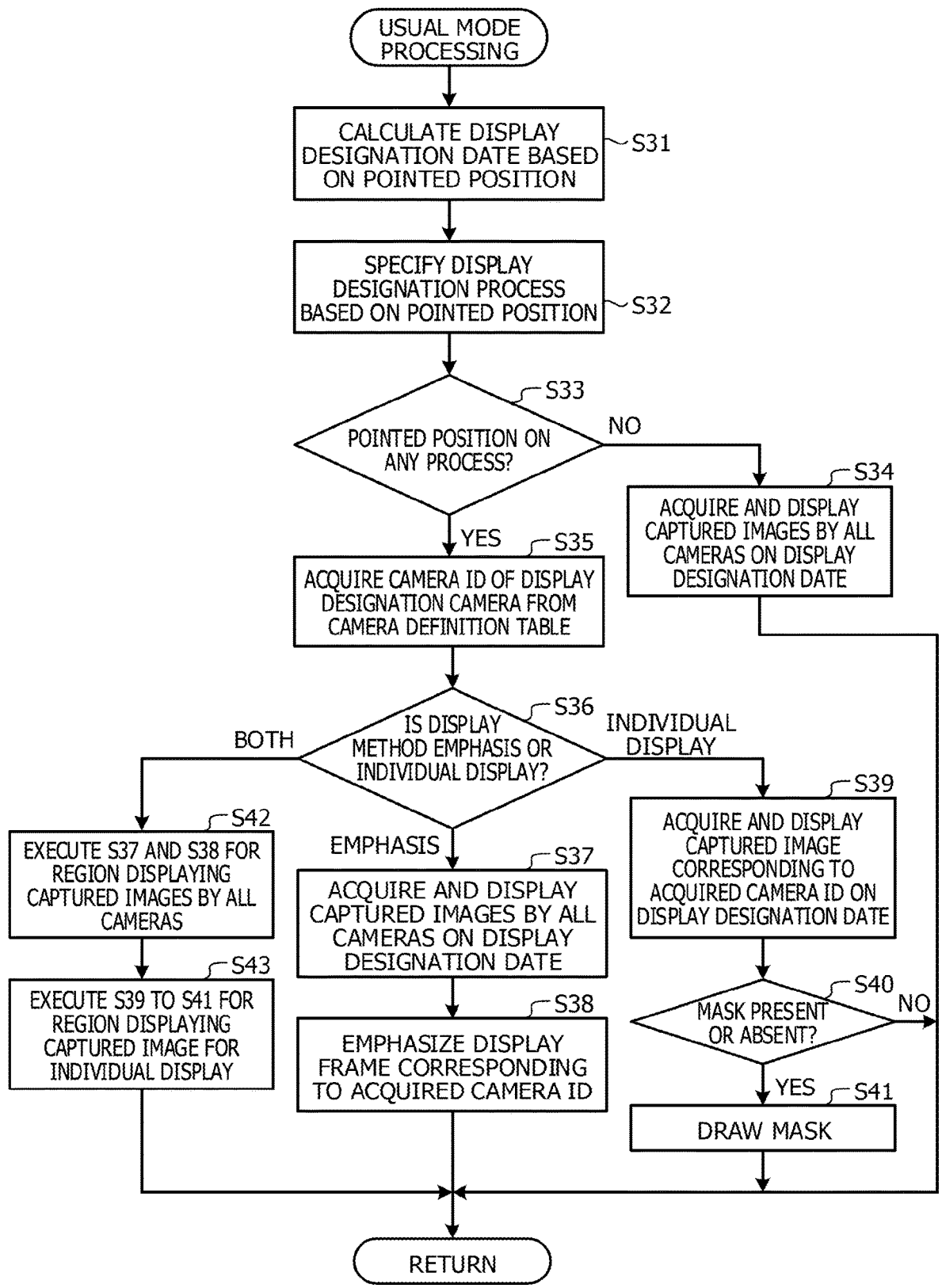
FIG. 17 is a flowchart that illustrates one example of usual mode processing.

Here, the usual mode processing is described by using FIG. 17. FIG. 17 is a flowchart that illustrates one example of the usual mode processing. As the usual mode processing, the specifying unit 132 first calculates the display designation date based on the pointed position that is indicated by the cursor position information (step S31). Further, the specifying unit 132 specifies the display designation process based on the pointed position (step S32).

The specifying unit 132 assesses whether or not the pointed position is on any process based on the calculated display designation date and the specified display designation process (step S33). In a case where the pointed position is not on any process (step S33: negative), the specifying unit 132 refers to the image DB 123, acquires the captured images by all the cameras on the display designation date, and outputs the acquired captured images to the image display unit 133. In a case where the captured images are input from the specifying unit 132, the image display unit 133 updates the display screen such that the captured images are displayed in the regions for displaying the captured images by the cameras in the display screen (step S34), and the usual mode processing returns to the original processing.

In a case where the pointed position is on any process (step S33: affirmative), the specifying unit 132 acquires the camera ID of the display designation camera from the camera definition table 122 (step S35). The specifying unit 132 assesses which of the emphasis or the individual display of the display methods is selected based on the selection situation of the emphasis button and the individual display button that are provided on the display screen (step S36). In a case where the emphasis is selected (step S36: emphasis), the specifying unit 132 refers to the image DB 123, acquires the captured images by all the cameras on the display designation date, and outputs the acquired captured images to the image display unit 133. In a case where the captured image is input from the specifying unit 132, the image display unit 133 updates the display screen such that the captured images are displayed in the region for displaying the captured images by the cameras in the display screen (step S37).

The specifying unit 132 outputs, to the image display unit 133, the emphasis instruction for emphatically displaying the display frame of the captured image that corresponds to the acquired camera ID. In a case where the emphasis instruction is input from the specifying unit 132, the image display unit 133 updates the display screen such that the display frame of the captured image that corresponds to the emphasis instruction is emphatically displayed (step S38), and the usual mode processing returns to the original processing.

In a case where the individual display is selected (step S36: individual display), the specifying unit 132 refers to the image DB 123, acquires the captured image on the display designation date, which corresponds to the acquired camera ID, and outputs the acquired captured image to the image display unit 133. In a case where the captured image is input from the specifying unit 132, the image display unit 133 updates the display screen such that the captured image is displayed in the region for displaying the captured image by the camera in the display screen (step S39).

The specifying unit 132 refers to the camera definition table 122 and assesses whether or not the mask item of the acquired camera ID is "True" (step S40). In a case where the mask item of the acquired camera ID is "True" (step S40: affirmative), the specifying unit 132 outputs, to the image display unit 133, the masking instruction for masking the other processes than the process that corresponds to the acquired camera ID. In a case where the masking instruction is input from the specifying unit 132, the image display unit 133 updates the display screen such that the mask that corresponds to the masking instruction is drawn (step S41), and the usual mode processing returns to the original processing. In a case where the mask item of the acquired camera ID is not "True" (step S40: negative), the specifying unit 132 does not output the masking instruction, and the usual mode processing returns to the original processing.

In a case where both of the emphasis and the individual display are selected (step S36: both), the specifying unit 132 executes steps S37 and S38 for the region that displays the captured images by all the cameras (step S42). Further, the specifying unit 132 executes steps S39 to S41 for the region that displays the captured image for the individual display (step S43), and the usual mode processing returns to the original processing. Accordingly, the management apparatus 100 may display the image that corresponds to the designated process by pointing.

Figure 18:
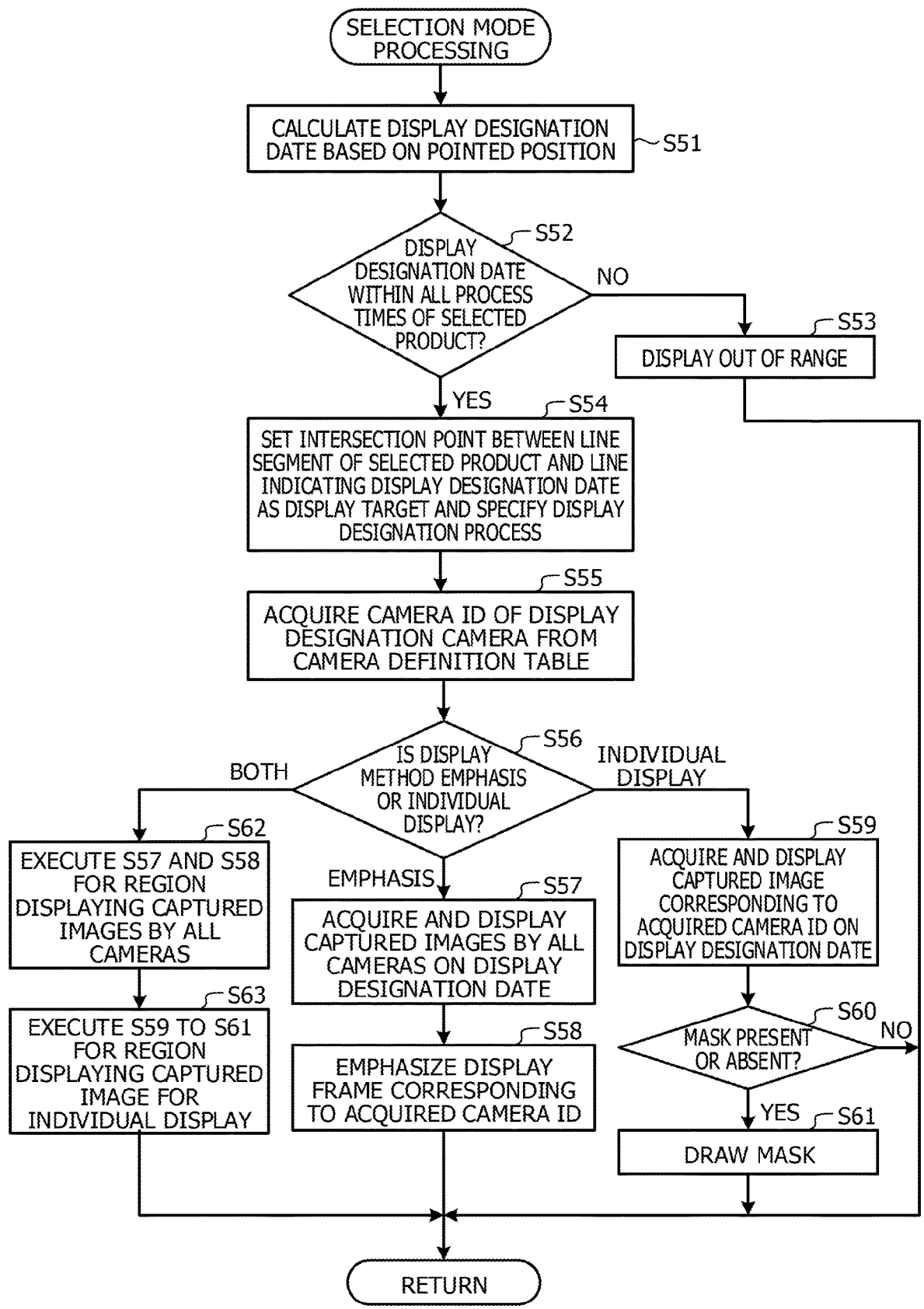
FIG. 18 is a flowchart that illustrates one example of selection mode processing.

Returning to the description of the management processing in FIG. 16, in a case where the line segment is selected in step S2 (step S2: affirmative), the specifying unit 132 executes the selection mode processing (step S4). Here, the selection mode processing is described by using FIG. 18. FIG. 18 is a flowchart that illustrates one example of the selection mode processing.

As the selection mode processing, the specifying unit 132 first calculates the display designation date based on the pointed position that is indicated by the cursor position information (step S51). The specifying unit 132 assesses whether or not the display designation date is within all the process times of the selected product (step S52). In a case where the display designation date is not within all the process times of the selected product (step S52: negative), the specifying unit 132 outputs, to the image display unit 133, the out-of-range instruction that displays a fact that the display designation date is out of range in the region for displaying the captured image. In a case where the out-of-range instruction is input from the specifying unit 132, the image display unit 133 updates the display screen such that the display that indicates out of range is performed in the region for displaying the captured image by the camera in the display screen (step S53), and the selection mode processing returns to the original processing.

In a case where the display designation date is within all the process times of the selected product (step S52: affirmative), the specifying unit 132 sets the intersection point between the line segment of the selected product and the line that indicates the display designation date as the display target and specifies the display designation process (step S54). The specifying unit 132 refers to the camera definition table 122 and acquires the camera ID of the display designation camera that corresponds to the process in which the intersection point as the display target is (step S55).

The specifying unit 132 assesses which of the emphasis or the individual display of the display methods is selected based on the selection situation of the emphasis button and the individual display button that are provided on the display screen (step S56). In a case where the emphasis is selected (step S56: emphasis), the specifying unit 132 refers to the image DB 123, acquires the captured images by all the cameras on the display designation date, and outputs the acquired captured images to the image display unit 133. In a case where the captured images are input from the specifying unit 132, the image display unit 133 updates the display screen such that the captured images are displayed in the region for displaying the captured images by the cameras in the display screen (step S57).

The specifying unit 132 outputs, to the image display unit 133, the emphasis instruction for emphatically displaying the display frame of the captured image that corresponds to the acquired camera ID. In a case where the emphasis instruction is input from the specifying unit 132, the image display unit 133 updates the display screen such that the display frame of the captured image that corresponds to the emphasis instruction is emphatically displayed (step S58), and the selection mode processing returns to the original processing.

In a case where the individual display is selected (step S56: individual display), the specifying unit 132 refers to the image DB 123, acquires the captured image on the display designation date, which corresponds to the acquired camera ID, and outputs the acquired captured image to the image display unit 133. In a case where the captured image is input from the specifying unit 132, the image display unit 133 updates the display screen such that the captured image is displayed in the region for displaying the captured image by the camera in the display screen (step S59).

The specifying unit 132 refers to the camera definition table 122 and assesses whether or not the mask item of the acquired camera ID is "True" (step S60). In a case where the mask item of the acquired camera ID is "True" (step S60: affirmative), the specifying unit 132 outputs, to the image display unit 133, the masking instruction for masking the other processes than the process that corresponds to the acquired camera ID. In a case where the masking instruction is input from the specifying unit 132, the image display unit 133 updates the display screen such that the mask that corresponds to the masking instruction is drawn (step S61), and the selection mode processing returns to the original processing. In a case where the mask item of the acquired camera ID is not "True" (step S60: negative), the specifying unit 132 does not output the masking instruction, and the selection mode processing returns to the original processing.

In a case where both of the emphasis and the individual display are selected (step S56: both), the specifying unit 132 executes steps S57 and S58 for the region that displays the captured images by all the cameras (step S62). Further, the specifying unit 132 executes steps S59 to S61 for the region that displays the captured image for the individual display (step S63), and the selection mode processing returns to the original processing. Accordingly, the management apparatus 100 may display the image that corresponds to the process which is selected and thereby designated.

Returning to the description of the management processing in FIG. 16, in a case where the usual mode processing or the selection mode processing is finished, the specifying unit 132 assesses whether or not the operation information for finishing the display is input from the operation unit 112 (step S5). That is, the specifying unit 132 assesses whether or not the operation information for finishing the display is input from the operation unit 112 while the display screen of the time line graph and the captured images is displayed.

In a case where the operation information for finishing the display is not input (step S5: negative), the specifying unit 132 returns to step S2. In a case where the operation information for finishing the display is input (step S5: affirmative), the specifying unit 132 outputs, to the image display unit 133, the finishing instruction that finishes the display of the display screen of the time line graph and the captured images. In a case where the finishing instruction is input from the specifying unit 132, the image display unit 133 finishes the display of the display screen. Accordingly, the management apparatus 100 may display the image that corresponds to the designated process.

In such a manner, the management apparatus 100 displays the graph that represents the elapsed time from the start to the finish of each manufacturing process of a plurality of manufacturing processes, based on the information of the starting times and the finishing times of the manufacturing processes, in a state where the plurality of manufacturing processes are divided into each of manufacturing processes in the execution order, while the time axes are aligned in the same direction. Further, the management apparatus 100 specifies the captured image that corresponds to the manufacturing process which corresponds to the designated position among the captured images of the plurality of manufacturing processes that are stored in the image DB 123 in accordance with the designated position on the displayed graph. Further, the management apparatus 100 displays the specified captured image. As a result, the image that corresponds to the designated process may be displayed. Further, it becomes easy to check, by images, the state of the processing time of the whole manufacturing line and the circumstance of the manufacturing performed in a specific process.

Further, in a case where a plurality of captured images about the plurality of manufacturing processes, which include the specified captured image, are displayed, the management apparatus 100 performs the display such that it is possible to distinguish which is the specified captured image among the plurality of captured images. As a result, the captured image of the desired process or product may easily be displayed in a distinguishable manner.

Further, in the management apparatus 100, the graph is displayed with the line segments, and the designated position is in any position on the line segment. As a result, the correspondence relationship between the designated process and the corresponding image may clearly be displayed.

Further, in the management apparatus 100, the any position on the line segment is based on the designation of the line segment and the designation of the time and corresponds to the position that corresponds to the designated time on the designated line segment. As a result, the image that corresponds to the designated time on the designated line segment may be displayed.

Further, in the management apparatus 100, the graph is displayed with the line segments, and the designated position is a position on the closest line segment to the pointed position or the touch position that is not on any line segment. As a result, even in a case where the line segment is thin, the line segment may easily be selected.

Further, in the management apparatus 100, the graph is displayed with the line segments. Further, the management apparatus 100 specifies the product related to the manufacturing process that corresponds to the first designated position as any position on the line segment on the graph and, after specifying the product, specifies the captured image that corresponds to the manufacturing process of the specified product in accordance with the time that corresponds to the second designated position on the graph which is different from the first designated position. As a result, the cursor is moved after selection of the line segment, and the captured image of each of the manufacturing processes related to the product of the selected line segment may thereby be displayed.

Note that in the above embodiment, in a case where the captured image in which an image of a plurality of processes is captured is displayed, the portion that corresponds to the pointed process is displayed by masking processing. However, embodiments are not limited to this. For example, the masking processing is not performed, but the administrator of the manufacturing process management system may determine the image of which process is the desired image with respect to the captured image in which the image of the plurality of processes is captured. Accordingly, because previous and subsequent circumstances of the product may be displayed, it becomes easier to recognize the situation.

Further, in the above embodiment, the selection mode is canceled in a case where the selected line segment or a portion off the line segment is clicked. However, embodiments are not limited to this. For example, a radio button of the usual mode that is provided in the display screen is selected, the selection mode is thereby switched to the usual mode, and the selection mode may be canceled.

Further, the configuration elements of the portions in the illustrations do not necessarily have to be physically configured as the illustrations. That is, specific manners of distribution and integration of the portions are not limited to the manners in the illustrations. All or a portion thereof may be configured by functionally or physically distributing or integrating those by any set in accordance with various kinds of loads, usage condition, and so forth. For example, the graph display unit 131 and the image display unit 133 may be integrated. Further, the pieces of processing in the illustrations are not limited to the above orders but may simultaneously be carried out or may be carried out while sequences are rearranged in the scope in which processing contents do not contradict.

In addition, all or an arbitrary portion of various kinds of processing functions performed by apparatuses may be executed in a CPU (or a microcomputer such as an MPU or a micro controller unit (MCU)). Further, it is matter of course that all or an arbitrary portion of various kinds of processing functions may be executed on a program that is analyzed and executed by the CPU (or the microcomputer such as the MPU or the MCU) or on hardware by wired logic.

Figure 19:
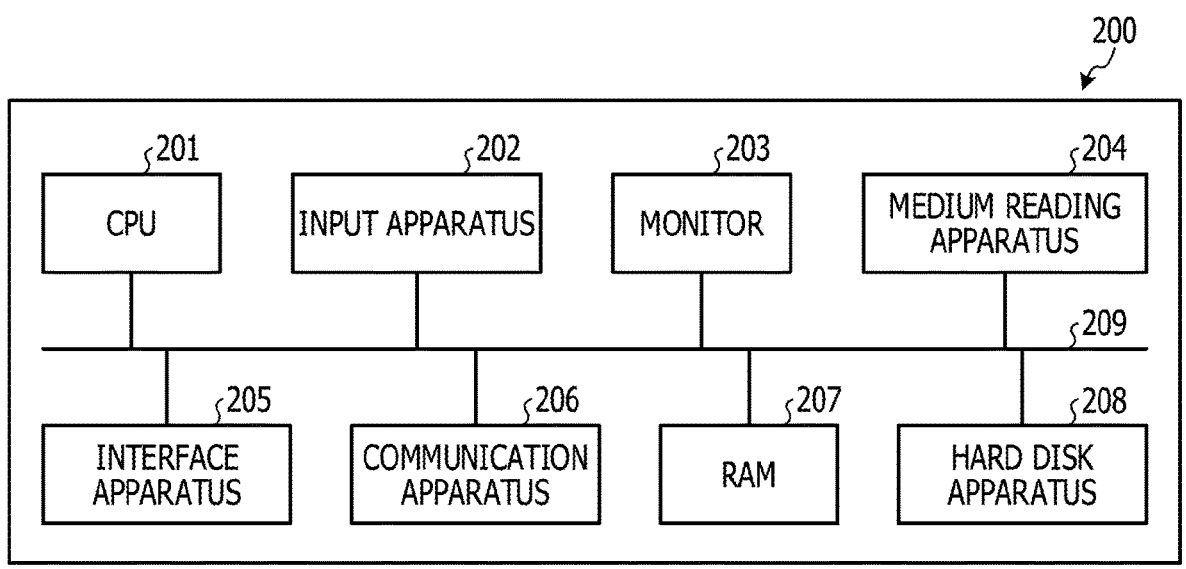
FIG. 19 is a diagram that illustrates one example of a computer which executes a manufacturing process management program.

Incidentally, the various kinds of processing that are described in the above embodiment may be realized by executing a program, which is in advance prepared, by a computer. Thus, in the following, a description is made about one example of a computer that executes a program which has similar functions to the above embodiment. FIG. 19 is a diagram that illustrates one example of a computer that executes the manufacturing process management program.

As illustrated in FIG. 19, a computer 200 has a CPU 201 that executes various kinds of computing processing, an input apparatus 202 that accepts data inputs, and a monitor 203. Further, the computer 200 has a medium reading apparatus 204 that reads a program or the like from a storage medium, an interface apparatus 205 for connection with various kinds of apparatuses, and a communication apparatus 206 for connecting with other information processing apparatuses and so forth in a wired or wireless manner. Further, the computer 200 has a RAM 207 that temporarily stores various kinds of information and a hard disk apparatus 208. Further, the apparatuses 201 to 208 are connected with a bus 209.

The hard disk apparatus 208 stores the manufacturing process management program that has similar functions to the processing units as the graph display unit 131, the specifying unit 132, and the image display unit 133, which are illustrated in FIG. 1. Further, the hard disk apparatus 208 stores various kinds of data for realizing the history DB 121, the camera definition table 122, the image DB 123, and the manufacturing process management program. The input apparatus 202 accepts inputs of various kinds of information such as operation information and management information from an administrator of the computer 200, for example. The monitor 203 displays the display screen, a screen of the management information, and various kinds of screens to the administrator of the computer 200, for example. The interface apparatus 205 is connected with a printing apparatus or the like, for example. The communication apparatus 206 has a similar function to the communication unit 110 illustrated in FIG. 1, is connected with a network that is not illustrated, and interchanges various kinds of information with various kinds of apparatuses, for example.

The CPU 201 reads out each program stored in the hard disk apparatus 208, expands each of the programs in the RAM 207, executes the program, and thereby performs various kinds of processing. Further, those programs may cause the computer 200 to function as the graph display unit 131, the specifying unit 132, and the image display unit 133, which are illustrated in FIG. 1.

Note that the above manufacturing process management program does not necessarily have to be stored in the hard disk apparatus 208. For example, the computer 200 may read out and execute the program that is stored in a storage medium which is readable by the computer 200. The storage medium that is readable by the computer 200 corresponds to a portable recording medium such as a CD-ROM, a DVD disk, or a universal serial bus (USB) memory, a semiconductor memory such as a flash memory, a hard disk drive, or the like, for example. Further, this manufacturing process management program is stored in apparatuses that are connected with a public line, the Internet, a LAN, and so forth, and the computer 200 may thereby read out the manufacturing process management program from those and execute the manufacturing process management program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A manufacturing process management system comprising:
    a display circuit; and
    a processor configured to:
        display, on a first area of a display screen of the display circuit, a graph which represents an elapsed time from a start to a finish of each of a plurality of manufacturing processes through which a product is manufactured with line segments, based on information of starting times and finishing times of the manufacturing processes, in a state where the plurality of manufacturing processes are divided into each of manufacturing processes in an execution order and time axes are aligned in a same direction;
        specify, from among captured images which each indicates one or more manufacturing processes included in the plurality of manufacturing processes and which are stored in a storage, a captured image which indicates the manufacturing process for a first designated position, which is located on one of the line segments in the first area of the display screen and is designated by an screen operation on the first area of the display screen, or a second designated position, which is located on an area other than the line segments in the first area of the display screen and is designated by the screen operation on the first area of the display screen; and
        display, on a second area of the display screen, the specified captured image together with the graph on the first area of the display screen.

2. The manufacturing process management system according to claim 1, wherein the processor, in a case where another captured images other than the specified captured image are displayed together with the specified captured image, performs display such that the specified captured image among the another captured images is distinguishable.

3. The manufacturing process management system according to claim 1, wherein the processor calculates a display time based on the first designated position and the second designated position.

4. The manufacturing process management system according to claim 3, wherein the processor, when the first designated position is designated, determines whether the display time is within a time period of the plurality of manufacturing process.

5. The manufacturing process management system according to claim 1, wherein the processor, when the second designated position is designated, specifies, as the specified captured image, a captured image which indicates the manufacturing process which corresponds to a closest line segment to the second designated position.

6. The manufacturing process management system according to claim 1, wherein the processor specifies the product related to the manufacturing process that corresponds to the first designated position or the second designated position and, after specifying the product, specifies a captured image that corresponds to the manufacturing process of the specified product in accordance with time that corresponds to a third designated position on the graph which is designated by the screen operation and is different from the first designated position or the second designated position.

7. A manufacturing process management method comprising:
    displaying, on a first area of a display screen of a display device, a graph which represents an elapsed time from a start to a finish of each of a plurality of manufacturing processes through which a product is manufactured with line segments, based on information of starting times and finishing times of the manufacturing processes, in a state where the plurality of manufacturing processes are divided into each of manufacturing processes in an execution order and time axes are aligned in a same direction;
    specifying, from among captured images which each indicates one or more manufacturing processes included in the plurality of manufacturing processes and which are stored in a storage, a captured image which indicates the manufacturing process for a first designated position, which is located on one of the line segments in the first area of the display screen and is designated by an screen operation on the first area of the display screen, or a second designated position, which is located on an area other than the line segments in the first area of the display screen and is designated by the screen operation on the first area of the display screen; and
    displaying, on a second area of the display screen, the specified captured image together with the graph on the first area of the display screen.

8. The manufacturing process management method according to claim 7, further comprising:
    in a case where another captured images other than the specified captured image are displayed together with the specified captured image, performing display such that the specified captured image among the another captured images is distinguishable.

9. The manufacturing process management method according to claim 7, further comprising:
    calculating a display time based on the first designated position and the second designated position.

10. The manufacturing process management method according to claim 9, further comprising:
    determining, when the first designated position is designated, whether the display time is within a time period of the plurality of manufacturing process.

11. The manufacturing process management method according to claim 7, further comprising:
    specifying, when the second designated position is designated, as the specified captured image, a captured image which indicates the manufacturing process which corresponds to a closest line segment to the second designated position.

12. The manufacturing process management method according to claim 7, further comprising:
    specifying the product related to the manufacturing process that corresponds to the first designated position or the second designated position; and
    specifying, after specifying the product, a captured image that corresponds to the manufacturing process of the specified product in accordance with time that corresponds to a third designated position on the graph which is designated by the screen operation and is different from the first designated position or the second designated position.

13. A non-transitory computer-readable recording medium recording a manufacturing process management program which causes a computer to perform a process, the process comprising:

displaying, on a first area of a display screen of a display device, a graph which represents an elapsed time from a start to a finish of each of a plurality of manufacturing processes through which a product is manufactured with line segments, based on information of starting times and finishing times of the manufacturing processes, in a state where the plurality of manufacturing processes are divided into each of manufacturing processes in an execution order and time axes are aligned in a same direction;

specifying, from among captured images which each indicates one or more manufacturing processes included in the plurality of manufacturing processes and which are stored in a storage, a captured image which indicates the manufacturing process for a first designated position, which is located on one of the line segments in the first area of the display screen and is designated by an screen operation on the first area of the display screen, or a second designated position, which is located on an area other than the line segments in the first area of the display screen and is designated by the screen operation on the first area of the display screen; and displaying, on a second area of the display screen, the specified captured image together with the graph on the first area of the display screen on the display device.

14. The non-transitory computer-readable recording medium according to claim 13, further comprising:

in a case where another captured images other than the specified captured image are displayed together with the specified captured image, performing display such that the specified captured image among the another captured images is distinguishable.

15. The non-transitory computer-readable recording medium according to claim 13, further comprising:

calculating a display time based on the first designated position and the second designated position.

16. The non-transitory computer-readable recording medium according to claim 15, further comprising:

determining, when the first designated position is designated, whether the display time is within a time period of the plurality of manufacturing process.

17. The non-transitory computer-readable recording medium according to claim 13, further comprising:

specifying, when the second designated position is designated, as the specified captured image, a captured image which indicates the manufacturing process which corresponds to a closest line segment to the second designated position.

18. The non-transitory computer-readable recording medium according to claim 13, further comprising:

specifying the product related to the manufacturing process that corresponds to the first designated position or the second designated position; and specifying, after specifying the product, a captured image that corresponds to the manufacturing process of the specified product in accordance with time that corresponds to a third designated position on the graph which is designated by the screen operation and is different from the first designated position or the second designated position.

\* \* \* \* \*